(12) United States Patent
Hanyu et al.

(10) Patent No.: US 6,456,349 B1
(45) Date of Patent: *Sep. 24, 2002

(54) LIQUID CRYSTAL ELEMENT AND LIQUID CRYSTAL APPARATUS USING THE SAME

(75) Inventors: Yukio Hanyu, Atsugi; Yutaka Inaba, Kawaguchi; Masanobu Asaoka, Yokohama; Osamu Taniguchi, Chigasaki; Kenji Shinjo, Atsugi; Toshiharu Uchimi, Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/527,775

(22) Filed: Sep. 13, 1995

Related U.S. Application Data

(62) Division of application No. 08/272,652, filed on Jul. 11, 1994, now Pat. No. 5,481,387, which is a continuation of application No. 08/115,269, filed on Sep. 2, 1993, now abandoned, which is a continuation of application No. 07/984,543, filed on Dec. 2, 1992, now abandoned, which is a division of application No. 07/663,436, filed on Mar. 1, 1991, now Pat. No. 5,189,536.

(30) Foreign Application Priority Data

| Mar. 2, 1990 | (JP) | 2-049582 |
| Apr. 6, 1990 | (JP) | 2-090414 |
| May 28, 1990 | (JP) | 2-139033 |
| Jul. 3, 1990 | (JP) | 2-174492 |

(51) Int. Cl.$^7$ ............ G02F 1/141; C09K 19/02
(52) U.S. Cl. ............ 349/134; 349/172
(58) Field of Search ............ 359/100; 349/134, 349/172, 100

(56) References Cited

U.S. PATENT DOCUMENTS

| 4,813,767 A | 3/1989 | Clark et al. ......... 359/100 |
| 4,898,456 A | 2/1990 | Okada et al. ......... 359/56 |

(List continued on next page.)

FOREIGN PATENT DOCUMENTS

| EP | 0307959 | 3/1989 |
| JP | 1077021 | 3/1989 |

OTHER PUBLICATIONS

"High Resolution, Large Area FLC Displaying With High Graphic Performance", Kanbe et al., Ferroelectrics, vol. 114 (1991) 3:26.
Conference, Second International Symposium on Ferroelectric Liquid Crystals (Jul. 27–30, 1989).

(List continued on next page.)

*Primary Examiner*—Kenneth Parker
(74) *Attorney, Agent, or Firm*—Fitzpatrick, Cella, Harper & Scinto

(57) ABSTRACT

A ferroelectric liquid crystal element comprises a ferroelectric liquid crystal and a pair of substantially parallel substrates having opposite surfaces between which the ferroelectric liquid crystal is sealed. The substrates are provided with electrodes to which voltages are applied, and are subjected to one axis orientation treatment so as to orient the ferroelectric liquid crystal. The ferroelectric liquid crystal has an orientation state represented by the following condition:
$\theta < \alpha + \delta$
wherein $\alpha$ is a pretilt angle of the ferroelectric liquid crystal, $\theta$ is a tilt angle, and $\delta$ is an inclination angle of an Sm*C layer. The ferroelectric liquid crystal exhibits at least two stable states in orientation. An angle $\theta_a$ ½ between optical axes of these two stable states and the tilt angle $\theta$ of the ferroelectric liquid crystal satisfy the condition $\theta > \theta_a > \theta/2$.

10 Claims, 17 Drawing Sheets

U.S. PATENT DOCUMENTS

| | | |
|---|---|---|
| 4,900,132 A | 2/1990 | Bos .............................. 359/87 |
| 4,932,758 A | 6/1990 | Hanyu et al. ................ 359/100 |
| 4,941,736 A | 7/1990 | Taniguchi et al. ............. 359/56 |
| 4,958,916 A | 9/1990 | Clark et al. .................... 359/56 |
| 5,013,137 A | 5/1991 | Tsuboyama et al. ........ 359/100 |
| 5,046,822 A | 9/1991 | Matsuda et al. ............ 359/100 |
| 5,061,044 A | 10/1991 | Matsunaga ................... 359/56 |
| 5,189,536 A | 2/1993 | Hanyu et al. ................. 359/56 |
| 5,347,381 A | 9/1994 | Shinomiya et al. ......... 359/100 |

OTHER PUBLICATIONS

Patel et al., "A Reliable Method of Alignment for Smectic Liquid Crystals" Ferroelectronics, vol. 59, pp. 137–144 (1984).

Yamamoto et al., "Ferroelectric Liquid Crystal Display with High Contrast Ratio," Japanese Journal of Applied Physics, vol. 26, No. 3, 524–29 (Mar. 1989).

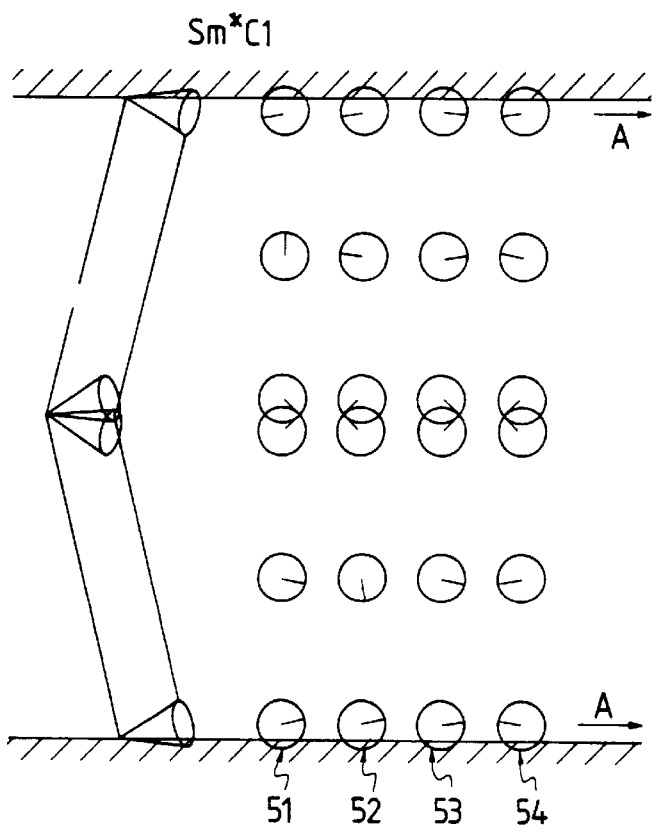
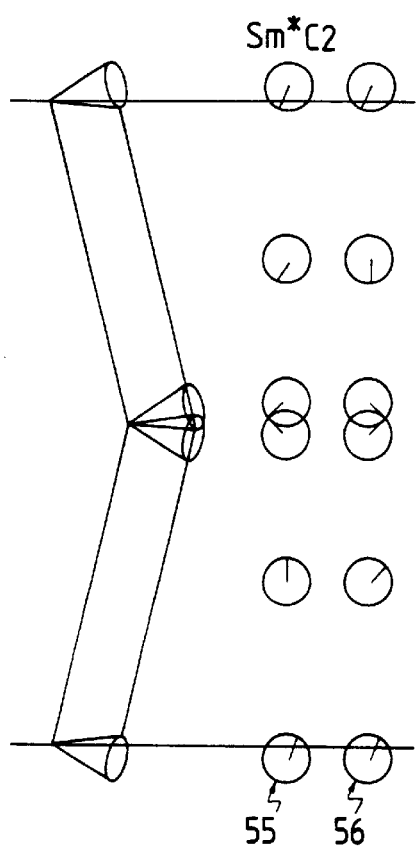
FIG. 5A  FIG. 5B
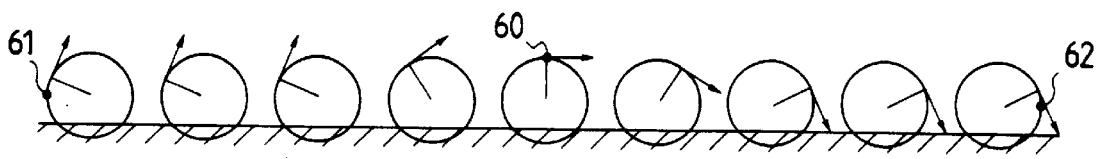
FIG. 6

LIQUID CRYSTAL ELEMENT AND LIQUID CRYSTAL APPARATUS USING THE SAME

This application is a division of Application Ser. No. 08/272,652 filed Jul. 11, 1994, now U.S. Pat. No. 5,481,387, which is a continuation of application Ser. No. 08/115,269 filed Sep. 2. 1993, now abandoned, which is a continuation of application Ser. No. 07/984,543 filed Dec. 2, 1992, now abandoned, which is a division of application Ser. No. 07/663,436 filed Mar. 1, 1991, now U.S. Pat. No. 5,189,536, issued Feb. 23, 1993.

BACKGROUND OF THE INVENTION

1. Field of the Invention

The present invention relates to a liquid crystal-element such as a liquid crystal display element or an liquid crystal optical shutter and, more particularly, to a ferroelectric liquid crystal element and a liquid crystal apparatus using the same. More specifically, the present invention relates to a liquid crystal element and a liquid crystal apparatus using the same, in which display characteristics are improved by improving an orientation state of liquid crystal molecules.

2. Related Background Art

A display element for controlling a transmission beam by a combination with a polarization element by Utilizing refractive index anisotropy of ferroelectric liquid crystal molecules is proposed by Clark and Lagerwall (Japanese Laid-Open Patent Application No. 56-107216 and corresponding U.S. Pat. No. 4,367,924). This ferroelectric liquid crystal has a chiral smectic C phase (SmC*) or H phase (SmH*) having a non-helical structure. In this state, the ferroelectric liquid crystal has the first or second optically stable state in response to an electric field applied thereto. When no electric field is applied to this ferroelectric liquid crystal, it maintains the current state. In this manner, the ferroelectric liquid crystal has a bistable property and has a high response speed to a change in electric field. It is expected as a high-speed storage type display element in a variety of applications. In particular, this ferroelectric liquid crystal is expected for an application as a large, high-precision display due to the functions of the liquid crystal.

In order to enhance a predetermined drive characteristic of an optical modulation element using this bistable liquid crystal, the liquid crystal sealed between a pair of parallel substrates is required to be kept in a molecular orientation state to cause effective phase transition between the above two stable states.

A transmittance of a liquid crystal element utilizing a birefringence of the liquid crystal under the presence of crossed Nicols is given as follows:

$$I/I_0 = \sin^2 4\theta \sin^2 \frac{\delta nd}{\lambda}\pi$$

where $I_0$ is the incident light intensity, $I$ is the transmitted light intensity, $\theta$ is the tilt angle, $\Delta n$ is the refractive index anisotropy, $d$ is the thickness of a liquid crystal layer, and $\lambda$ is the wavelength of incident light.

The tilt angle $\theta$ in the non-helical structure appears as an angle of an average molecular axis of liquid crystal molecules having helical arrangements in the first and second orientation states. According to the above equation, a maximum transmittance can be obtained when the tilt angle $\theta$ is given as 22.5°. The tilt angle $\theta$ in the non-helical structure for realizing the bistable property must be as close as to 22.5°.

Of orientation methods of ferroelectric liquid crystals, a method capable of aligning a molecular layer consisting of a plurality of molecules constituting a smectic liquid crystal along a uniaxial direction along a normal to the molecular layer, and capable of achieving such orientation by simple rubbing is preferable.

An example of the method of aligning a ferroelectric liquid crystal and, particularly, a chiral smectic liquid crystal having a non-helical structure is described in U.S. Pat. No. 4,561,726.

The following problem is posed when the conventional orientation method and, particularly, an orientation method using a rubbed polyimide film is applied to a ferroelectric liquid crystal having a non-helical structure exhibiting the bistable property and announced by Clark and Lagerwall.

According to experiments of the present inventors, it is found that an apparent tilt angle $\theta$ (i.e., ½ an angle formed by two molecular axes of the two stable states) of a ferroelectric liquid crystal having a non-helical structure aligned by a conventional rubbed polyimide film is smaller than a tilt angle (i.e., an angle $\theta$ which is ½ a vertex angle of a triangular cone, shown in FIG. 4A to be described later) of a ferroelectric liquid crystal having a helical structure. In particular, the tilt angle $\theta$ of the ferroelectric liquid crystal having the non-helical structure oriented by the conventional rubbed polyimide film generally falls within the range of about 3° to 8°, and its transmittance falls within a maximum range of about 3% to 5%.

As can be apparent from the above description, according to Clark and Lagerwall, although the tilt angle of a ferroelectric liquid crystal having a non-helical structure for realizing the bistable property must be equal to the tilt angle of a ferroelectric liquid crystal having a helical structure, the tilt angle $\theta$ of the non-helical structure is smaller than the tilt angle $\theta$ of the helical structure. In addition, it is also found that a cause for setting the tilt angle $\theta$ of the non-helical structure to be smaller than that ($\theta$) of the helical structure is based on helical orientation of liquid crystal molecules in the non-helical structure. More specifically, in a ferroelectric liquid crystal having a non-helical structure, liquid crystal molecules are continuously twisted from an axis of the liquid crystal molecules adjacent to the upper substrate to the axis of the liquid crystal molecules adjacent to the lower substrate with respect to the normal to the substrates. For this reason, the tilt angle $\theta$ of the non-helical structure is smaller than the tilt angle $\theta$ of the helical structure.

Since a polyimide orientation film serving as an insulating layer is present between each electrode and the liquid crystal layer, when a voltage having one polarity is applied to the chiral smectic liquid crystal which is oriented by the conventional rubbed polyimide orientation film so as to switch the orientation state from the first optically stable state (e.g., a white display state) to the second optically stable state (e.g., a black display state), a reverse electric field $V_{rev}$ having the other polarity is applied to the ferroelectric liquid crystal after the voltage having one polarity is withdrawn. The electric field $V_{rev}$ causes an after image at the time of display.

This reverse electric field generation phenomenon is described in Akio Yoshida, "SSFLC Switching Characteristics", Lecture Papers on Liquid Crystal Forum, October, 1987, pp. 142–143.

One of the present inventors found the following phenomenon associated with an orientation state of a ferroelectric liquid crystal.

An LP 64 (tradename) having a relatively small pretilt angle available from TORAY INDUSTRIES, INC. or the like is applied to substrates to form orientation films thereon, and the substrates respectively having the orientation films are rubbed and adhered to each other with a gap of about 1.5 μm such that the rubbing direction of one substrate is the same as that of the other substrate. A ferroelectric liquid crystal CS1014 (tradename) available from Chisso Kabushiki Kaisha is injected into the space defined between the two substrates of the obtained cell and is sealed. When the temperature of the ferroelectric liquid crystal is decreased, phase transitions shown in FIGS. 2A to 2E are obtained. More specifically, in a state shown in FIG. 2A immediately after the phase transition from a high-temperature phase to an Sc* phase, the ferroelectric liquid crystal takes orientation states (C1 orientation states) 21 and 22 having a small contrast value. When the temperature is further decreased and reaches a given temperature region, zig-zag defects 23 are generated, and orientation states (C2 orientation states) 24 and 25 having large contrast values with respect to these defects appear, as shown in FIG. 2B. When the temperature is further decreased, the C2 orientation state propagates (FIGS. 2C and 2D), and the entire liquid crystal is set in the C2 orientation state (FIG. 2E).

These C1 and C2 orientation states can be described in accordance with a difference in chevron structure of the smectic layer, as shown in FIG. 3. Smectic layers 31 in FIG. 3 are classified into C1 orientation regions 32 and a C2 orientation region 33.

A smectic liquid crystal generally has a layer structure. When the $S_A$ phase transits into an $S_C$ or $S_C^*$ phase, the layer interval is reduced, and the layers have a structure bent at the center between the upper and lower substrates (i.e., the chevron structure), as shown in FIG. 3. The bending direction is determined by the C1 and C2 orientation states. However, as is known well, the bending direction is determined such that liquid crystal molecules at the substrate boundary form an angle with respect to the substrate surface (pretilt) and are inclined so that the heads of the liquid crystal molecules are inclined toward the rubbing direction (e.g., the leading ends float). Since the elastic energy of the C1 orientation state is not equal to that of the C2 orientation state, phase transitions occur at the predetermined temperatures described above. In addition, a phase transition may occur due to a mechanical stress.

When the layer structure of FIG. 3 is observed from the top, a boundary 34 from the C1 orientation state to the C2 orientation state in the rubbing direction has a zig-zag pattern and is called a lightening defect, while a boundary 35 from the C2 orientation state to the C1 orientation state in the rubbing direction forms a wide slow curve and is called a hairpin defect. There is provided a conventional liquid crystal element using the C2 orientation state of the C1 and C2 orientation states in favor of high contrast.

A liquid crystal apparatus using the ferroelectric liquid crystal element described above is taken into consideration. A matrix display apparatus having stripe electrodes on the inner surfaces of a pair of substrates used in the ferroelectric liquid crystal element so that the stripe electrodes are perpendicular to each other can be driven by methods disclosed in Japanese Laid-Open Patent Application Nos. 59-193426, 59-193427, 60-156046, and 60-156047.

FIG. 18 shows a drive waveform wherein periods of (1) a "black" erase phase and (2) a selective "white" write phase are assigned to a selection period of one scanning line. In the period of the (1) erase phase, a positive voltage is applied to scanning electrodes to set all or predetermined pixels on the scanning line in the first stable state (to be referred to as a "black" erase state hereinafter). In the period of the (2) selective "white" write phase, a negative voltage is applied to the scanning electrodes, and a positive voltage is selectively applied to only data electrodes corresponding to pixels (selection pixels) supposed to be inverted to the second stable state (to be referred to as a "white" state hereinafter). The negative voltage is applied to the data electrodes corresponding to the remaining pixels (semi-selection pixels). An inversion electric field having a threshold value or more is generated by the selection pixel, while an inversion electric field having a value smaller than the threshold value is generated by the semi-selection pixel. "White" is written in the selection pixel, while, a "black" state is maintained in the semi-selection pixel. At this time, the absolute value of the erase phase voltage is always equal to that of the write phase voltage.

In a method of rubbing a polymer film of, e.g., polyimide or polyvinyl alcohol having a relatively small pretilt angle, as the most popular method of controlling orientation of a ferroelectric liquid crystal, the two orientation states (bistable, i.e., splay orientation) wherein the apparent tilt angle θ is as small as about ½ the true tilt angle θ are very important, as previously described.

When multiplex driving is applied to an element having these orientation states by using the drive waveform shown in FIG. 18, sufficiently high contrast cannot be obtained while a sufficient drive margin can be obtained. Therefore, much room for improvement in elements is left.

SUMMARY OF THE INVENTION

The present invention has been made in consideration of the conventional technical problems, and has as its object to provide a liquid crystal element having a higher contrast than that of the conventional element.

It is another object of the present invention to provide a ferroelectric liquid crystal element capable of obtaining a display for forming a large tilt angle θ in a non-helical structure of a chiral smectic liquid crystal, displaying an image having a high contrast, and inhibiting formation of an after image.

It is still another object of the present invention to provide a ferroelectric liquid crystal element capable of assuring a sufficient drive margin.

It is still another object of the present invention to provide a liquid crystal apparatus having a means capable of performing a display having a sufficiently drive margin, a high contrast, and a high transmittance.

BRIEF DESCRIPTION OF THE DRAWINGS:

FIG. 5A is a view illustrating director orientation directions at the respective positions between substrates in the C1 orientation state;

FIG. 5B is a view illustrating director orientation directions at the respective positions between substrates in the C2 orientation state;

FIG. 6 is a view showing states of directors near a boundary between two areas having different interface molecular positions;

DETAILED DESCRIPTION OF THE PREFERRED EMBODIMENTS

Figure 1:
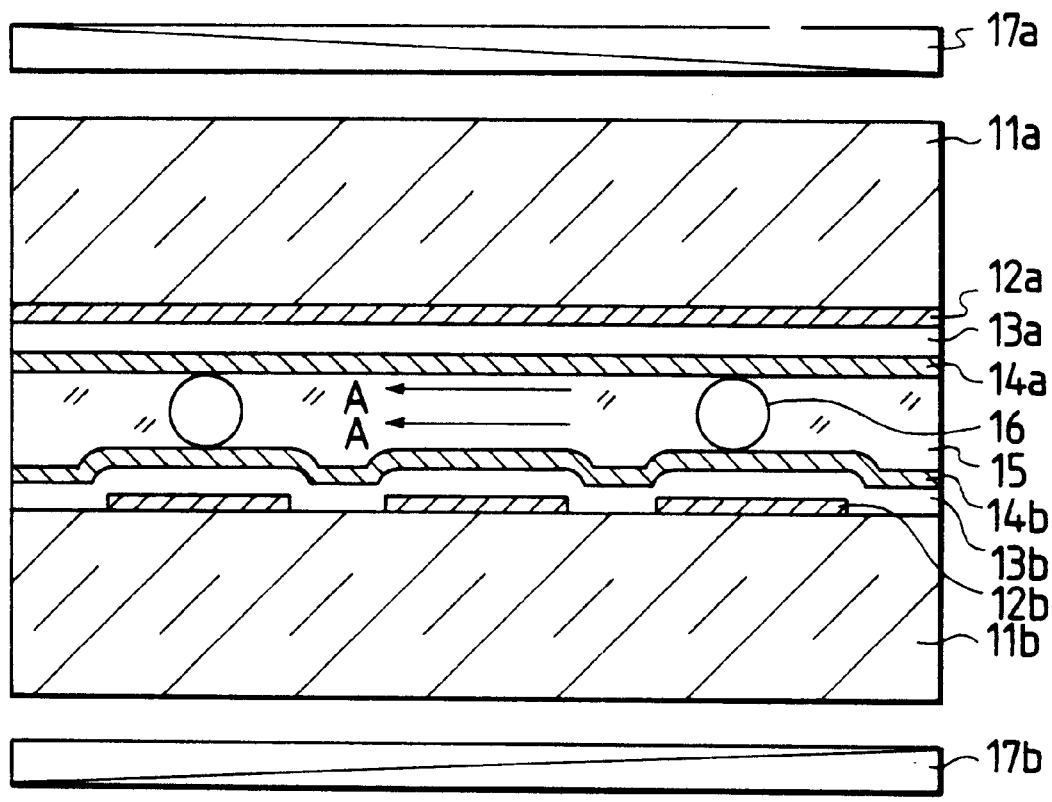
FIG. 1 is a sectional view illustrating a ferroelectric liquid crystal cell.
Figure 2A:
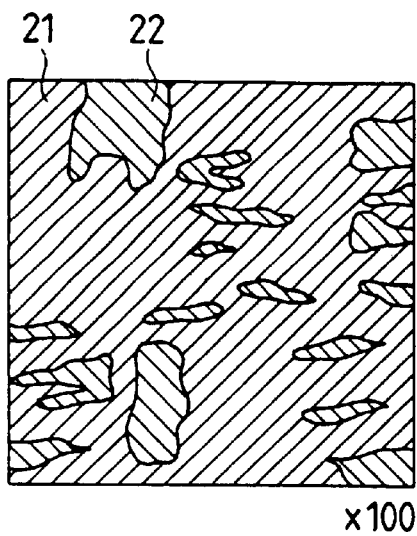
FIGS. 2A to 2E are views showing changes in orientation states when the temperature of a liquid crystal cell is gradually decreased after a ferroelectric liquid crystal is injected and sealed in the liquid crystal cell shown in FIG. 1.
Figure 2B:
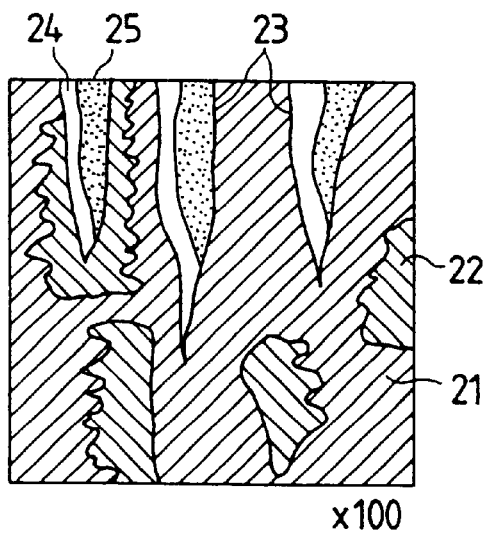
Figure 2C:
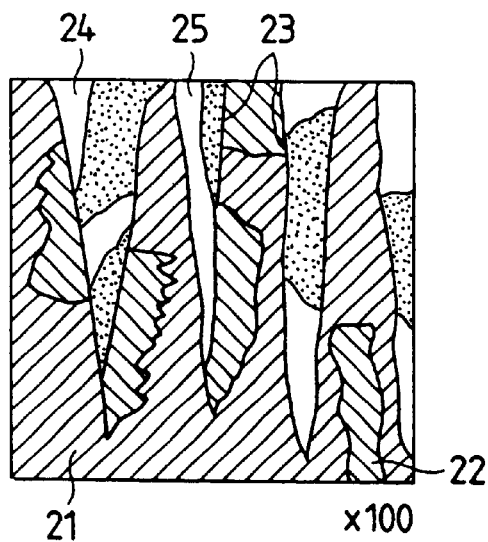
Figure 2D:
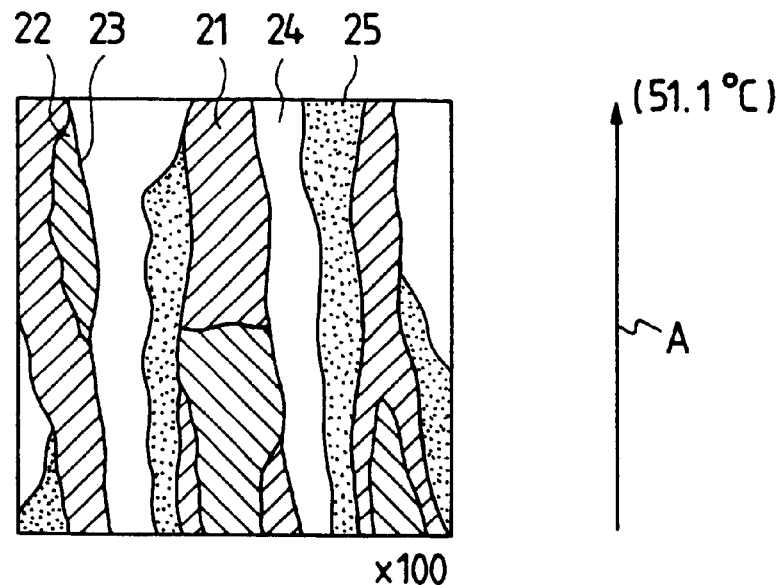
Figure 2E:
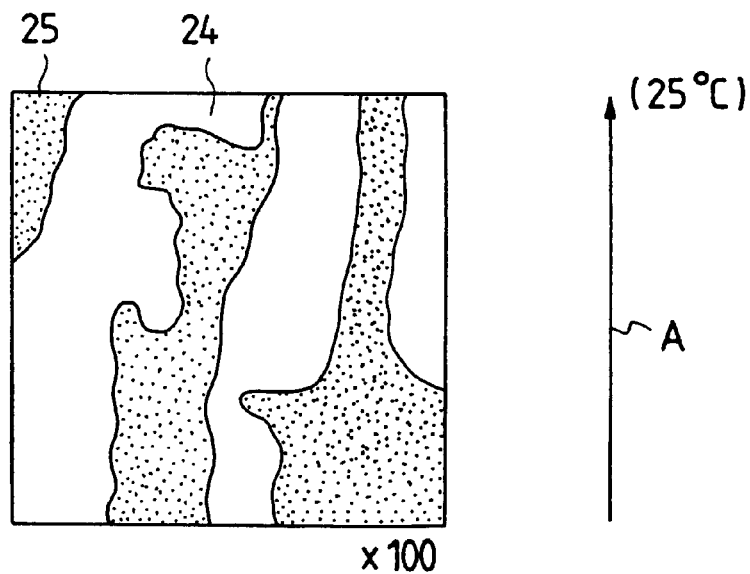

Preferred embodiments of the present invention will be described below.

I. According to the present invention, a liquid crystal element comprising a ferroelectric liquid crystal and a pair of substantially parallel substrates having opposite surfaces between which the ferroelectric liquid crystal is sealed, the substrates being provided with electrodes to which voltages are applied and being oriented in one axis so as to orient the ferroelectric liquid crystal, is characterized in that (1) the ferroelectric liquid crystal has an orientation state represented by the following condition:

$$\theta < \alpha + \delta$$

where $\alpha$ is the pretilt angle of the ferroelectric liquid crystal, $\theta$ is the tilt angle, and $\delta$ is the inclination angle of the Sm*C layer; or (2) the ferroelectric liquid crystal can have an orientation state surrounded by hairpin or lightening defects upon application of a stress to substrates by a foreign material such as a spacer interposed between the substrates, and this orientation state is caused by defects in an order of lightening and hairpin defects with respect to a direction in which the liquid crystal molecules float from the orientation surface by the pretilt; or (3) the ferroelectric liquid crystal can have an orientation state surrounded by hairpin or lightening defects upon application of a stress to substrates by a foreign material such as a spacer interposed between the substrates, and this orientation state is caused by defects in an order of lightening and hairpin defects with respect to the rubbing direction; or (4) the ferroelectric liquid crystal does not have any change in orientation accompanying defects while the orientation states are changed from a high temperature of the SmA phase or the like to a lower temperature of the Sm*C phase; and (a) the ferroelectric liquid crystal in the orientation state exhibits at least two stable states, and an angle $\theta_a$ ½ the angle between optical axes of these two stable states and the tilt angle $\theta$ of the ferroelectric liquid crystal satisfy the following condition:

$$\theta > \theta_a > \theta/2$$

or (b) the ferroelectric liquid crystal in the orientation state exhibits at least two stable states, and a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the two stable states, or (c) the ferroelectric liquid crystal in the orientation state has a total of three or four stable states, i.e., two stable states having small transmittances corresponding to almost a light extinction level under crossed Nicols and one or two stable states having large transmittances corresponding to the light extinction level under crossed Nicols, or (d) the ferroelectric liquid crystal in the orientation state has a total of four stable states, i.e., first and second stable states having small transmittances corresponding to almost a light extinction level under crossed Nicols and third and fourth stable states having large transmittances corresponding to the light extinction level under crossed Nicols, a color formed by the first stable state upon rotation of one polarization plate from a position of a light-absorbing axis of the other polarization plate perpendicular to the one polarization plate through 3° to 30° clockwise is the same as that formed by the second stable state upon rotation through the same range of angles counterclockwise when a light-absorbing axis of one polarization plate is located at a position for bisecting an angle formed by optical axes of the first and second stable states, and a color of the third stable state upon rotation of only the one polarization plate through 3° to 30° clockwise is different from that of the fourth stable state upon rotation of only the one polarization plate by the same range of angles counterclockwise.

The orientation state is preferably present within the range of all temperatures from $(T_1-5)°$ C. to $(T_1-(10 \text{ to } 40))°$ C. where $T_1$ (°) is the transition temperature from an SmA phase to an Sm*C phase.

The liquid crystal preferably has an orientation state in which the pretilt angle $\alpha$ and the inclination angle $\delta$ of the Sm*C layer almost satisfy the following condition:

$$\delta < \alpha$$

In addition, in the cases of (1) and (4), the orientation state preferably has three or four different stable states without going through the lightening and hairpin defects.

II. According to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, and the chiral smectic liquid crystal having an orientation state satisfying the following condition:

$$\theta < \alpha + \delta$$

where $\alpha$ is the pretilt angle of the chiral smectic liquid crystal, $\theta$ is the tilt angle, and $\delta$ is the inclination angle of an Sm*C layer, is characterized in that the chiral smectic liquid crystal consists of a chiral smectic liquid crystal which exhibits a one-axis orientation state within an arbitrary temperature range upon a phase transition from a smectic A phase to a chiral smectic C phase during cooling and which exhibits at least two stable states during further cooling, and an angle $\theta_a$ ½ an angle formed by optical axes in the two stable states and a tilt angle $\theta$ of the chiral smectic liquid crystal satisfy condition $\theta > \theta_a > \theta/2$ in an orientation state exhibiting at least two stable states.

III. In addition, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used i a first orientation state satisfying condition $T_1/T_2 < 2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a direction of floating of liquid crystal molecules from an orientation surface, the floating being caused by a pretilt, and $T_1$ is the pulse width threshold value of a portion outside the portion surrounded by the hairpin and lightening defects in a first orientation state, the first orientation state causing the chiral smectic liquid crystal to exhibit at least two stable states, and the first orientation state satisfying the following condition:

$$\theta > \theta_a > \theta/2$$

where $\theta_a$ is an angle which is ½ an angle formed by optical axes of the two stable states, and $\theta$ is the tilt angle of the chiral smectic liquid crystal.

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used in a first orientation state satisfying condition $T_1/T_2 < 2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a direction of floating of liquid crystal molecules from an orientation surface, the floating being caused by a pretilt, and $T_1$ is the pulse width threshold value of a portion outside the portion surrounded by the hairpin and lightening defects in a first orientation state, the first orientation state causing the chiral smectic liquid crystal to exhibit at least two stable states, and the first orientation state satisfying a condition wherein a color formed by the first stable state upon rotation of one polarization plate from a position of a light-absorbing axis of the other polarization plate perpendicular to the one polarization plate through 3° to 30° clockwise is the same as that formed by the second stable state upon rotation through the same range of angles counterclockwise when a light-absorbing axis of one polarization plate is located at a position for bisecting an angle formed by optical axes of the first and second stable states.

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used in a first orientation state satisfying condition $T_1/T_2 < 2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a direction of floating of liquid crystal molecules from an orientation surface, the floating being caused by a pretilt, and $T_1$ is the pulse width threshold value of a portion outside the portion surrounded by the hairpin and lightening defects in a first orientation state, the first orientation state satisfying a condition wherein the chiral smectic liquid crystal in the orientation state has a total of three or four stable states, i.e., two stable states having small transmittances corresponding to almost a light extinction level under crossed Nicols and one or two stable states having large transmittances corresponding to the light extinction level under crossed Nicols, and wherein the first orientation state is set in the first and second stable states having the small transmittances corresponding to the light extinction level.

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used in a first orientation state satisfying condition $T_1/T_2<2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a rubbing direction, and $T_1$ is the pulse width threshold value of a portion outside the portion surrounded by the hairpin and lightening defects in a first orientation state, the first orientation state satisfying a condition wherein the chiral smectic liquid crystal in the orientation state exhibits at least two stable states, and an angle $\theta_a$ ½ the angle between optical axes of these two stable states and the tilt angle $\theta$ of the ferroelectric liquid crystal satisfy the following condition:

$$\theta > \theta_a > \theta/2.$$

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used in a first orientation state satisfying condition $T_1/T_2<2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a rubbing direction, and $T_1$ is the pulse width threshold value of a portion outside the portion surrounded by the hairpin and lightening defects in a first orientation state, the first orientation state causing the chiral smectic liquid crystal to exhibit at least two stable states, and the first orientation state satisfying a condition wherein a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the first and second stable states.

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal consists of a chiral smectic liquid crystal used in a first orientation state satisfying condition $T_1/T_2<2.5$ at the same temperature where $T_2$ is the pulse width threshold value of a portion surrounded by lightening and hairpin defects in a second orientation state, when the chiral smectic liquid crystal exhibits an orientation state surrounded by hairpin and lightening defects, the lighting and hairpin defects occurring in an order named with respect to a rubbing direction, and $T_1$ is the pulse width threshold value of a portion outside the portion surrounded by the hairpin and lightening defects in a first orientation state, the first orientation state satisfying a condition wherein the chiral smectic liquid crystal in the orientation state has a total of three or four stable states, i.e., two stable states having small transmittances corresponding to almost a light extinction level under crossed Nicols and one or two stable states having large transmittances corresponding to the light extinction level under crossed Nicols, and wherein the first orientation state is set in the first and second stable states having the small transmittances corresponding to the light extinction level.

Furthermore, according to the present invention, a liquid crystal element comprising a chiral smectic liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, is characterized in that the chiral smectic liquid crystal has an orientation state satisfying the following condition:

$$\theta < \alpha + \delta$$

where $\alpha$ is the pretilt angle of the chiral smectic liquid crystal, $\theta$ is the tilt angle, and $\delta$ is the inclination angle of an Sm*C layer, the chiral smectic liquid crystal consists of a chiral smectic liquid crystal which exhibits at least two stable states in the orientation state, and the chiral smectic liquid crystal satisfies condition $T_1/T_2>2.5$ at the same temperature where $T_1$ is the pulse width threshold value of the chiral smectic liquid crystal in a first liquid crystal element satisfying the following condition:

$$\theta > \theta_a > \theta/2$$

where $\theta_a$ is an angle which is ½ an angle formed by optical axes of the two stable states, and $\theta$ is the tilt angle of the chiral smectic liquid crystal, and $T_2$ is the pulse width threshold value of the chiral smectic liquid crystal in a second liquid crystal element having the orientation state represented by condition $\theta > \alpha + \delta$, the second liquid crystal element being obtained by replacing a first orientation film of the first liquid crystal element with a second orientation film.

Preferred liquid crystal apparatuses according to the present invention are as follows.

IV. A liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state represented by the following condition:

$$\theta < \alpha + \delta$$

where $\alpha$ is the pretilt angle of the ferroelectric liquid crystal, $\theta$ is the tilt angle, and $\delta$ is the inclination angle of an Sm*C layer, the ferroelectric liquid crystal in the orientation state exhibiting at least two stable states, and an angle formed between optical axes of the two stable states satisfying the following condition:

$$\theta > \theta_a > \theta/2$$

where $\theta_a$ is an angle which is ½ the angle of the optical axes of the two stable states, and $\theta$ is the tilt angle of the ferroelectric liquid crystal, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state represented by the following condition:

$$\theta < \alpha + \delta$$

where $\alpha$ is the pretilt angle of the ferroelectric liquid crystal, $\theta$ is the tilt angle, and $\delta$ is the inclination angle of an Sm*C layer, the ferroelectric liquid crystal in the orientation state exhibiting at least two stable states, and the orientation state defined such that a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the first and second stable states, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state represented by the following condition:

$$\theta < \alpha + \delta$$

where $\alpha$ is the pretilt angle of the ferroelectric liquid crystal, $\theta$ is the tilt angle, and $\delta$ is the inclination angle of an Sm*C layer, the orientation state being defined such that the ferroelectric liquid crystal has a total of three or four stable states, i.e., two stable states having small transmittances corresponding to almost a light extinction level under crossed Nicols and one or two stable states having large transmittances corresponding to the light extinction level under crossed Nicols, and wherein the first orientation state is set in the first and second stable states having the small transmittances corresponding to the light extinction level, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a direction of floating of liquid crystal molecules from an orientation surface caused by a pretilt, the ferroelectric liquid crystal in the orientation state exhibiting at least two stable states, and an angle $\theta_a$ ½ the angle between optical axes of these two stable states and the tilt angle $\theta$ of the ferroelectric liquid crystal satisfying the following condition:

$$\theta > \theta_a > \theta/2$$

and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a direction of floating of liquid crystal molecules from an orientation surface caused by a pretilt, the ferroelectric liquid crystal in the orientation state exhibiting at least two stable states, and the orientation state being defined such that a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the first and second stable states, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a direction of floating of liquid crystal molecules from an orientation surface caused by a pretilt, and the orientation state being defined such that the ferroelectric liquid crystal has a total of three or four stable states, i.e., two stable states having small transmittances corresponding to almost a light extinction level under crossed Nicols and one or two stable states having large transmittances corresponding to the light extinction level under crossed Nicols, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a rubbing direction, the ferroelectric liquid crystal in the orientation state exhibiting at least two stable states, and an angle $\theta_a$ ½ the angle between optical axes of these two stable states and the tilt angle $\theta$ of the ferroelectric liquid crystal satisfying the following condition:

$$\theta > \theta_a > \theta/2$$

and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising a ferroelectric liquid crystal element including a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a rubbing direction, the ferroelectric liquid crystal in the orientation state exhibiting at least two stable states, and the orientation state being defined such that a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the first and second stable states, and means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising
    a ferroelectric liquid crystal element including
        a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and
        a ferroelectric liquid crystal sealed between the pair of substrates and having an orientation state surrounded by hairpin or lightening defects upon application of a stress to substrates by a foreign material such as a spacer interposed between the substrates, the orientation state being caused by defects in an order of lightening and hairpin defects with respect to a rubbing direction, and the orientation state being defined such that the ferroelectric liquid crystal has a total of three or four stable states, i.e., two stable states having small transmittances corresponding to almost a light extinction level under crossed Nicols and one or two stable states having large transmittances corresponding to the light extinction level under crossed Nicols, and
    means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising
    a ferroelectric liquid crystal element including
        a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and
        a ferroelectric liquid crystal sealed between the pair of substrates, having no change in orientation accompanying defects during cooling from a high temperature of an SmA phase or the like to a temperature of an Sm*C phase, and having at least two stable states in the orientation state, and an angle $\theta_a$ ½ the angle between optical axes of these two stable states and the tilt angle $\theta$ of the ferroelectric liquid crystal satisfying the following condition:

$$\theta > \theta_a > \theta/2$$

and
    means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising
    a ferroelectric liquid crystal element including
        a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and
        a ferroelectric liquid crystal sealed between the pair of substrates, having no change in orientation accompanying defects during cooling from a high temperature of an SmA phase or the like to a temperature of an Sm*C phase, and having at least two stable states in the orientation state, and the orientation state being defined such that a color formed by a first stable state upon rotation of one polarization plate from a position of a light-absorbing axis of the other polarization plate perpendicular to the one polarization plate through 3° to 30° clockwise is the same as that formed by a second stable state upon rotation through the same range of angles counterclockwise when a light-absorbing axis of one polarization plate is located at a position for bisecting an angle formed by optical axes of the first and second stable states, and
    means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

Furthermore, according to the present invention, a liquid crystal apparatus is characterized by comprising
    a ferroelectric liquid crystal element including
        a pair of substrates having a scanning electrode group and a data electrode group and each oriented in one axis, the axis of one of the pair of substrates being parallel or substantially parallel to the axis of the other of the pair of substrates and having the same direction as that of the other of the pair of substrates, and
        a ferroelectric liquid crystal sealed between the pair of substrates, having no change in orientation accompanying defects during cooling from a high temperature of an SmA phase or the like to a temperature of an Sm*C phase, and having an orientation state defined such that the ferroelectric liquid crystal has a total of three or four stable states, i.e., two stable states having small transmittances corresponding to almost a light extinction level under crossed Nicols and one or two stable states having large transmittances corresponding to the light extinction level under crossed Nicols, and
    means for applying a scanning signal to the scanning electrode group, the scanning signal being constituted by two phases, i.e., an erase phase and a write phase having different polarities, and the scanning signal having an absolute value of a voltage applied to a pixel of the erase phase to be larger than that applied to a pixel of the write phase.

The liquid crystal elements having the arrangements described above can solve all the conventional technical problems and achieve the objects of the present invention at a high level.

For example, a liquid crystal element of the present invention utilized to display a uniform state in C1 orientation can achieve a display for providing a high-contrast image at a high switching speed without forming an after image.

According to the liquid crystal element of the present invention, a drive margin can be sufficiently increased, a high contrast can be obtained, and an image having a high transmittance can be displayed.

The liquid crystal apparatuses having the above arrangements according to the present invention can solve the conventional technical problems and can achieve the objects at a high level.

In the liquid crystal apparatus according to the present invention, since the scanning signal applied to the scanning electrodes has two phases, i.e., the erase and write phases having different polarities, and the absolute value of the voltage of the erase phase is set to be larger than that of the write phase, the drive margin can be sufficiently increased. In addition, a high contrast can be obtained, and an image can be displayed at a high transmittance.

Preferred embodiments of the present invention will be described with reference to the accompanying drawings.

FIG. 1 illustrates a ferroelectric liquid crystal cell according to the present invention.

Substrates (glass plates) 11a and 11b are respectively covered with transparent electrodes 12a and 12b of, e.g., $In_2O_3$ and ITO (Indium Tin Oxide). Insulating films (e.g., an $SiO_2$, $TiO_2$ or $Ta_2O_5$ film) 13a and 13b each having a thickness of 200 to 3,000 Å, and orientation control Films 14a and 14b each having a thickness of 50 to 1,000 Å and made of polyimide represented by the formula described above are stacked on the transparent electrodes 12a and 12b, respectively. The orientation control films 14a and 14b are rubbed (in a direction indicated by an arrow A) so that their orientation directions are parallel and equal to each other (i.e., the direction of the arrow A). A ferroelectric smectic liquid crystal 15 is sealed between the substrates 11a and 11b, and a distance between the substrates 11a and 11b is set to be small (e.g., 0.1 to 3 μm) enough to suppress formation of a helical alignment structure of the ferroelectric smectic liquid crystal 15. The ferroelectric smectic liquid crystal 15 is set in a bistable orientation state. The sufficiently small distance described above is defined by a bead spacer 16 (e.g., silica or alumina beads) interposed between the substrates 11a and 11b. The liquid crystal element also includes polarization plates 17a and 17b.

With the above structure, the present inventors also found the following when a specific orientation film is combined with liquid crystal materials:

(1) A phase transition from C1 to C2 tends not to occur, and no C2 orientation state occurs depending on the type of liquid crystal material; and (2) In addition to two stable states having low contrast levels in the C1 orientation state, which have been found in a conventional technique, other two stable states having high contrast levels in the C1 orientation state are obtained.

If the entire screen of the display element is set in the C1 orientation state and the two states having high contrast levels in the C1 orientation state are used as two states for a black-and-white display, a display having higher quality than that of the conventional display can be expected.

More specifically, according to the findings of the present inventors, in a ferroelectric liquid crystal element comprising a liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, when the ferroelectric liquid crystal is set to have an orientation state satisfying the following condition:

$$\theta < \alpha + \epsilon$$

where $\alpha$ is the pretilt angle of the ferroelectric liquid crystal, $\theta$ is the tilt angle (½ of the cone), and $\delta$ is the inclination angle of the Sm*C layer, the liquid crystal in the C1 orientation state can be set in one of four states each having a chevron structure. These four C1 orientation states are different from the conventional C1 state. Of these four C1 states, two states constitute a bistable state (uniform state). The C1 orientation uniform state has a higher contrast than the bistable state in C2 orientation. Therefore, in this uniform state, when the liquid crystal is driven, a large tilt angle $\theta$ can be formed, an image having a high contrast can be displayed, and no after image is formed.

Points (1) and (2) described above will be described in detail below.

As for point (1), a phase transition from C1 to C2 depends on the angle (pretilt angle) formed between the liquid crystal molecules near the interface of each substrate and the substrate, the inclination angle of the layer, and the liquid crystal tilt angle, as indicated in Table 1.

TABLE 1

| Orientation Film | Liquid Crystal | a | b | c |
|---|---|---|---|---|
| | Tilt Angle θ | 12° | 16° | 22° |
| | Inclination Angle δ of Layer | 9.0° | 12.5° | 16.5° |
| | Pretilt Angle α | | | |
| A | 2.5° | C2 | C2 | C2 |
| B | 6° | C1 | C1 | C1/C2 Mixing |
| C | 12° | C1 | C1 | C1 |

Figure 11:
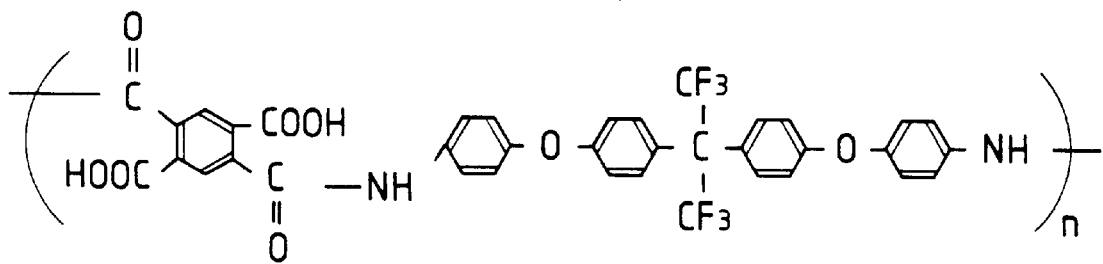
FIG. 11 shows a chemical formula of a polyimide orientation film obtained by sintering a polyamic acid.

Table 1 shows results of orientation states obtained by injecting and sealing three types of liquid crystals a to c having different tilt angles in cells having orientation films A to C having different pretilt angles. The orientation film A consisted of a polyimide obtained by sintering a polyamic acid, LP64 (tradename), commercially available from TORAY INDUSTRIES, INC. The orientation film B consisted of a polyimide obtained by sintering a polyamic acid, SE610 (tradename), commercially available from Nissan Chemical Industries, Ltd. The orientation film C consisted of a polyimide obtained by sintering a polyamic acid represented by a formula in FIG. 11. The pretilt angles of the orientation films A, B, and C are 2.5°, 6°, and 12°, respectively.

It is apparent from Table 1 that the C1 orientation can be maintained when the pretilt angle is large and the tilt angle is small due to the following consideration.

Figure 4A:
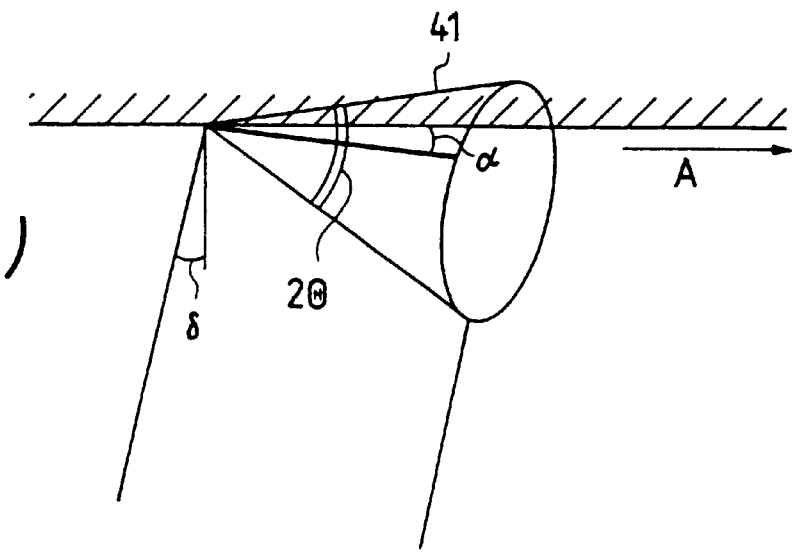
FIGS. 4A(*a*) and 4A(*b*) are views showing a relationship between tilt angles, pretilt angles, and layer inclination angles of the C1 and C2 orientation states.
Figure 4A:
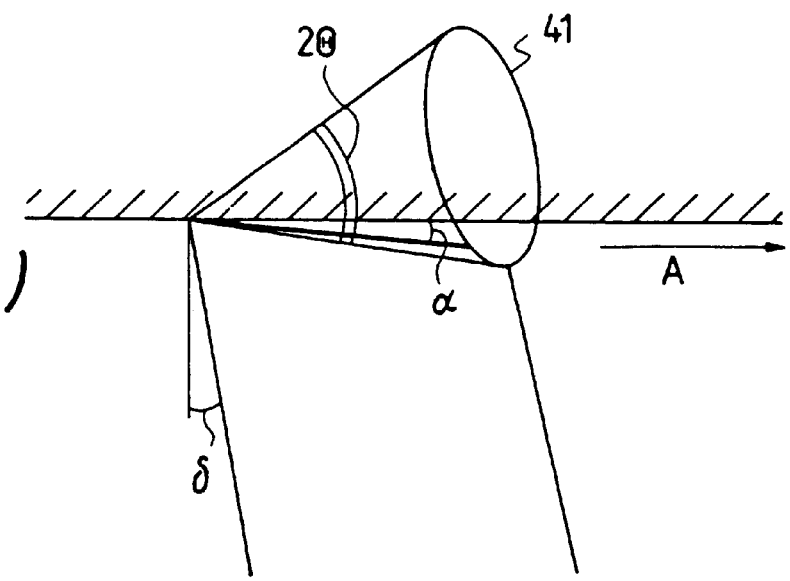

Since directors near the substrates in the C1 and C2 orientation states are located on cones 41 in FIGS. 4A(a) and 4A(b), the following relationships must be established between the tilt angles θ, the pretilt angles α, and the layer inclination angles δ:

If C1 orientation is set, then θ+δ>α  (2)

If C2 orientation is set, then θ−δ>α  (3)

Since the layer inclination angle δ has a slightly smaller value than the tilt angle θ, a liquid crystal having a small tilt angle θ has a smaller (θ−δ) value. When the pretilt angle a is large, the condition (3) is not satisfied, and the C2 orientation state does not appear. Therefore, a condition for causing the C1 orientation without causing the C2 orientation is given as follows:

θ−δ<α  (4)

Since the tilt angles and the layer inclination angles depend on liquid crystal temperatures, condition (4) is not established at a lower temperature even if condition (4) is established at a given temperature higher than the lower temperature, thus causing C2 orientation. Condition (4) must be established in the entire temperature range for using this liquid crystal as a display device.

In the present invention, the pretilt angle α preferably falls within the range of 6°<α<30°, more preferably the range of 8°<α<30°, and most preferably the range of 10°<α<30°. The tilt angle θ preferably falls within the range of 7°<α<27°, and the angle δ preferably falls within the range of 0°<δ<25°.

Figure 4B:
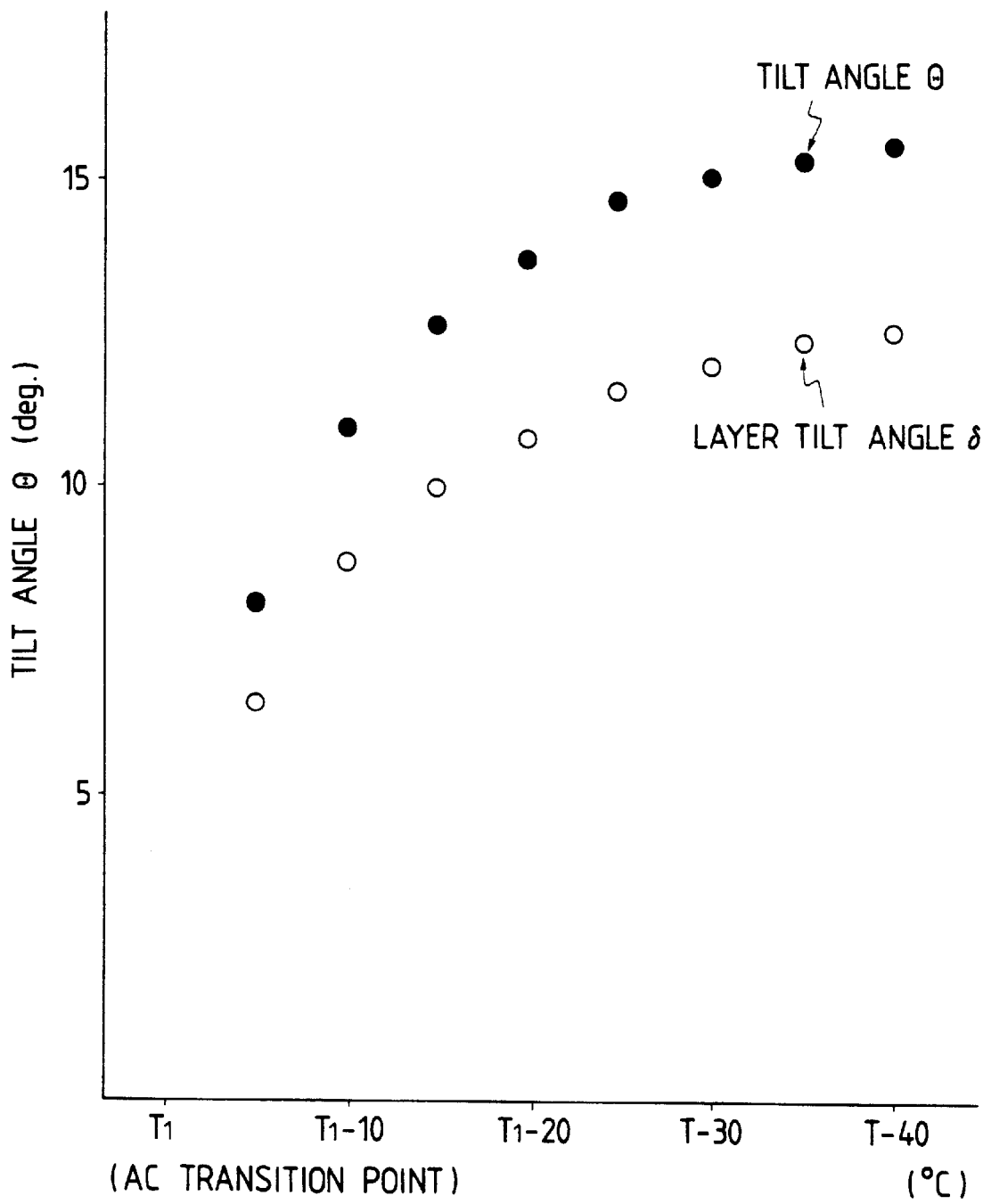
FIG. 4B is a graph showing changes in liquid crystal tilt angle θ and the layer inclination angles δ as a function of temperature.

FIG. 4B shows changes in tilt angles θ and the layer inclination angles δ as a function of temperature. The angles θ and δ abruptly change at a phase transition point $T_{AC}$ from the SA phase to the $S_C^*$ phase, and are increased when the angles have larger differences from the phase transition point. In the latter case, the changes in temperature are moderate. As shown in FIG. 4B, the difference between the angles θ and δ is zero for $T=T_{AC}$ and is increased at lower temperatures.

Condition (4) is established in a temperature range from the phase transition point to a predetermined temperature determined by the liquid crystal and the orientation film, but is not established at a temperature below this temperature range. If this sample is used as a display element within this temperature range, the C1 orientation state can be maintained. Although it is preferable to establish a wider temperature range, it can be sufficient to assure a temperature range of 5° to 35° in practice. On the other hand, when this sample is set at a temperature undesirably closer to the phase transition point, the angle θ is excessively small, resulting in an impractical application. In this sense, this sample is often used at a temperature having a difference of about 5° from the phase transition point in practice. Equation (4) is preferably established in at least the range of $(T_{AC}-5)°$ C. to $(T_{AC}-10)°$ C., and preferably in the range of $(T_{AC}-5)°$ C. to $(T_{AC}-40)°$ C.

Point (2) will be described in detail below. In a conventional low-pretilt orientation angle, there are only two stable states having low contrast levels in the C1 orientation state. However, in a high-pretilt orientation film such as the orientation film C in Table 1, the four stable states are present in the C1 orientation. Of these four stable states, two stable states having the same low contrast levels as in the conventional stable states (since blue light can be observed without an extinction light level under the view of a polarizing microscope, the directors of the liquid crystal are twisted between the upper and lower substrates; these states will be called a splay state hereinafter), and the remaining two states have high contrast states and large apparent tilt angles (these states have a light extinction level in the view of the polarizing microscope; these states will be referred to as a uniform state hereinafter). The contrast and the transmittance of the newly found uniform states have higher values than those in C2 orientation. The C1 uniform states have lower transmittances of the light extinction level under crossed Nicols than those of the C1 splay states, so that the C1 splay states are not easily distinguished from each other. Therefore, a total of three states, i.e., two uniform states and one splay state may be observed.

Table 2 shows apparent tilt angles $θ_a^{splay}$ obtained without applying any electric filed in the splay states of several liquid crystals a to d, the apparent tilt angles $θ_a^{uniform}$ in the uniform state, and the tilt angle θ. The ratios of $θ_a^{splay}$ to θ and $θ_a^{uniform}$ to θ are also listed in Table 2. As is apparent from this table, the apparent tilt angles are smaller in the splay state than in the uniform state even if the same material is used. In addition, the ratios are given as $θ_a^{splay}/θ<0.4$ in the splay state and $θ_a^{uniform}/θ>0.5$ in the uniform state. According to the present invention, states representing condition $θ>θ_a>θ/2$ are called uniform states.

TABLE 2

| Liquid Crystal Characteristic Amount | a | b | c | d |
| --- | --- | --- | --- | --- |
| Tilt Angle θ | 12° | 17° | 22° | 13° |
| Apparent Tilt Angle $θ_a^{splay}$ | 5° | 6° | 7° | 5° |
| $θ_a^{splay}/θ$ | 0.42 | 0.35 | 0.32 | 0.38 |
| Apparent Tilt Angle $θ_{in}^{uniform\ state}$ | 10° | 12° | 16° | 7° |
| $θ_a^{uniform}/θ$ | 0.83 | 0.71 | 0.73 | 0.54 |

According to the findings of the present inventors, in a ferroelectric liquid crystal element comprising a liquid crystal and a pair of substantially parallel substrates having opposite surfaces between which the chiral smectic liquid crystal is sealed, the substrates being provided with electrodes to which voltages are applied and being oriented in one axis so as to orient the chiral smectic liquid crystal, the ferroelectric liquid crystal is set to have an orientation state satisfying the following condition:

θ<α+δ where α is the pretilt angle of the ferroelectric liquid crystal, θ is the tilt angle (½ of the cone), and δ is the inclination angle of the Sm*C layer, the ferroelectric liquid crystal in this orientation state has at least two stable states, and the ferroelectric liquid crystal is utilized for a display in a uniform state of C1 orientation satisfying a condition given such that $θ_a$ which is ½ an angle formed by optical axes of these two stable states and the tilt angle θ of the ferroelectric liquid crystal satisfy the following condition:

$θ>θ_a>θ/2$.

According to the C1 orientation defined in the present invention, an orientation state surrounded by hairpin and lightening defects upon application of a stress to a substrate by a foreign material such as a spacer interposed between the substrates is caused, and at the same time, the lightening and hairpin defects occur in a direction of floating of the liquid crystal molecules from an orientation surface by the pretilt or in a rubbing direction in an order named. The C1 orientation is also defined as a state in which no changes occur in orientation accompanying defects during cooling from a high temperature of a smectic A (SmA) phase or the like to a temperature of a smectic C (Sm*C) phase.

Differences between the splay and uniform states in C1 orientation are a difference between the apparent tilt angles, as described above, and a difference in contrast. More specifically, splay orientation cannot provide a perfect light extinction level under crossed Nicols in a dark state, so that a darker state can be obtained when the polarization plate is located at a position angularly returning from the crossed Nicols position by several degrees. To the contrary, the uniform orientation has an almost perfect light extinction level under crossed Nicols, and represents a high contrast ratio for this reason. This difference can be further clarified by the following measurement.

The light-absorbing axis of one polarization plate is aligned with a position where no contrast is present between up and down states under the crossed Nicols, i.e., with a direction (i.e., a direction toward a smectic layer) for bisecting an angle formed between optical axes of the two states, and the light-absorbing axis of the other polarization plate is aligned in a direction perpendicular to that of one polarization plate. When only an analyzer (i.e., the polarization plate on the observer side) is rotated clockwise through an appropriate angle falling within the range of 3° to 30°, a difference in light-transmitting states, i.e., contrast, of the up and down states occurs. In many cases, the up state appears as a dark color, while the down state appears as a light color. When the analyzer is rotated through the same appropriate angle counterclockwise, an opposite phenomenon occurs. That is, the up state appears as a light color, while the down state appears as a dark color.

The coloring states upon rotation of the analyzer will be taken into consideration, in a cell having a gap of 1.0 μm to 2.0 μm, (1) when clockwise rotation is performed for the up and down states in splay orientation, the color of the up state is dark brown to reddish purple; and when counterclockwise rotation is performed, the color of the down state is blue to dark blue, so that these two colors are different from each other.

(2) on the other hand, when the same operations are performed for the up and down states in uniform orientation, colors of both the states are dark brown to reddish purple.

This difference is assumed to be caused depending on whether directors are twisted between the upper and lower substrates. In any case, the splay orientation can be quantitatively distinguished from the uniform orientation by the above measurement.

The four states in C1 orientation according to the present invention are subjected to transitions upon application of an electric field. When weak positive and negative pulsed electric fields are applied, a transition occurs between the two splay states. When strong positive and negative pulsed electric fields are applied, a transition occurs between the two uniform states. When the two uniform states are used, a display element having a higher contrast than that of the conventional technique can be obtained.

Occurrence of the uniform states depends on selection of a liquid crystal. Table 3 shows test results of the presence/absence of the uniform states of some liquid crystals by using the orientation film C in Table 1. It is apparent that uniform states tend to occur in a liquid crystal having a smaller inclination angle. The cause of this is not clear, but the following inference may be proposed.

TABLE 3

| Liquid Crystal Material | d | e | f | g |
| --- | --- | --- | --- | --- |
| Inclination Angle δ (°) | 8 | 9.5 | 12 | 13.5 |
| Area of Splay Orientation | 0% | 5% | 50% | 90% |
| Area of Uniform Orientation | 100% | 95% | 50% | 10% |

In the uniform state, the directors are not twisted between the upper and lower substrates in consideration of their optical characteristics. FIG. 5A is a view showing the layout of directors at the respective positions between the substrates in the respective states of C1 orientation. States 51 to 54 are obtained by projecting the directors in the respective states on the bottom surface of the cone and by observing the projected images from the bottom side. The states 51 and 52 represent splay states, while the states 53 and 54 represent uniform states. As is apparent from FIG. 5A, in the two uniform states 53 and 54, the liquid crystal molecules at the interface of the upper or lower substrate are reversed from those in the splay state. FIG. 5B shows C2 orientation in which no switching at any interface occurs, and two states can occur by internal switching. FIG. 6 shows states of directors near an interface of two areas having different interface molecular positions. Since it is assumed that the position of an interface molecule is shifted from one to the other through a vertex 60 of the cone shown in FIG. 6, this shift tends to occur when the tilt angle is small. Therefore, a uniform state can be realized by using a liquid crystal having a small tilt angle.

A direction of a torque received by an interface molecule shifted from one position to the other position upon application of an electric field depends on a molecule position on a cone. That is, when the molecule is located at a position having a higher pretilt than that of cone ends 61 and 62 of FIG. 6, this molecule receives a torque passing through the vertex 60 of the cone. However, when the molecule is located at a position lower than the cone ends 61 and 62, the molecule receives a torque to be urged against the corresponding substrate. Therefore, the former case facilitates switching. A condition for locating a pretilt molecule higher than the cone ends 61 and 62 can be given as follows in a simple geometric consideration:

$$\sin \alpha > \sin \delta \cos \theta \tag{5}$$

When the pretilt angle α, the layer inclination angle δ, and the tilt angle θ are small, the above condition can be approximated as follows:

$$\alpha > \delta \tag{6}$$

Figure 3:
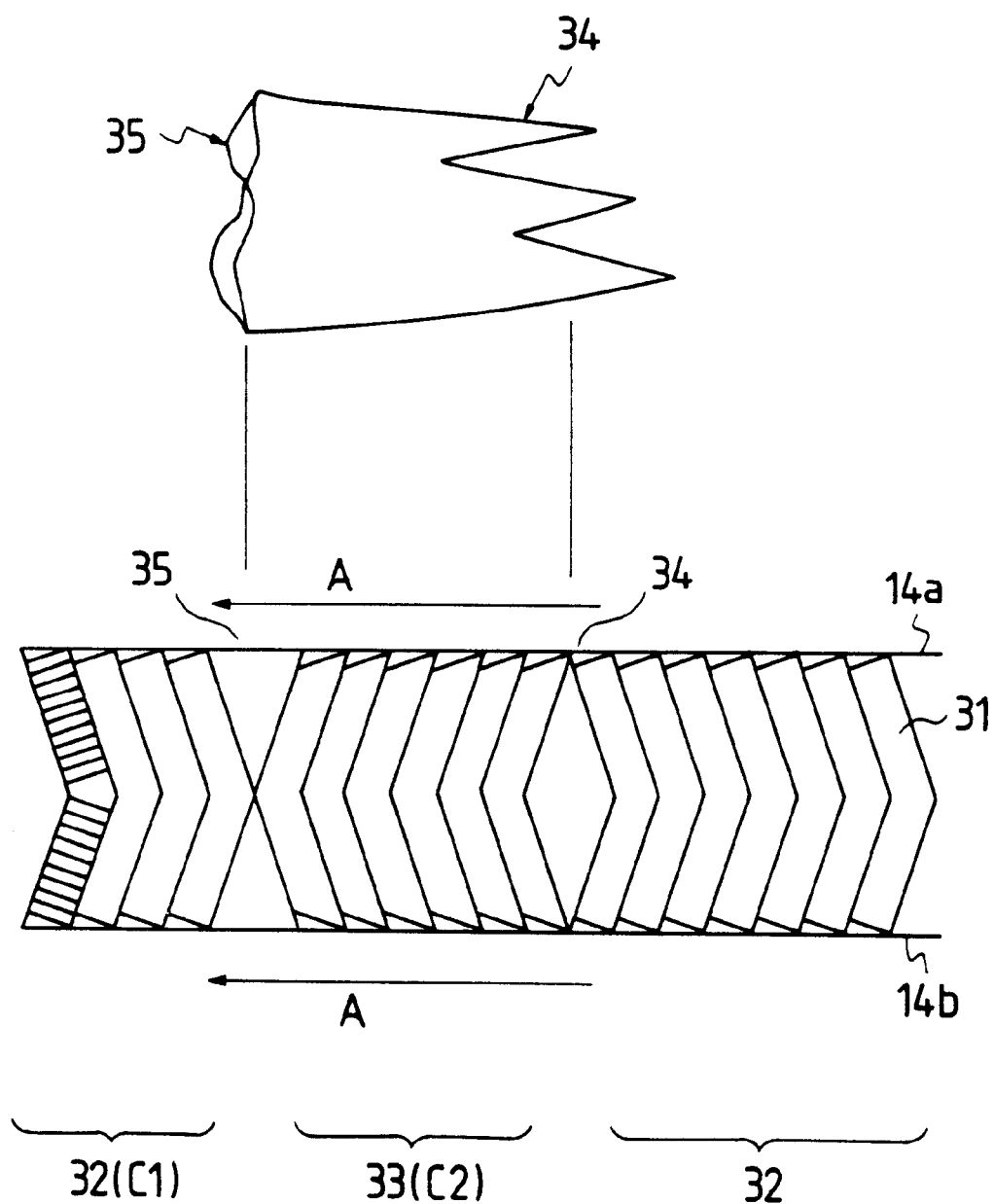
FIG. 3 is a view for explaining a difference between C1 and C2 orientation states.

It is interpreted that since the layer inclination angle δ has a value close to the tilt angle θ, the test results shown in FIG. 3 are obtained.

In order to more stably form the uniform states in C1 orientation, it is effective to additionally satisfy condition α>δ.

In order to stably form the uniform states, cross rubbing may be performed such that rubbing directions of the upper and lower substrates are shifted within the range of 0 to 20°.

In this manner, when the uniform states in C1 orientation are used, a display element having a higher contrast level than that of a conventional technique can be realized.

In the above tests, the tilt angles θ, the layer inclination angles δ, the pretilt angles α, and the apparent tilt angles $\theta_a$ were measured as follows:

Measurement of Tilt Angle θ

An FLC element interposed between crossed Nicol was horizontally rotated with respect to the polarization plates while a DC voltage of 10 V to 30 V was kept applied to upper and lower substrates, thereby finding a first light extinction level (i.e., a position having a smallest transmittance). A DC voltage having a polarity opposite to that of the DC voltage described above was kept applied to the upper and lower substrates to find a second light extinction level. At this time, an angle which was ½ an angle from the first light extinction level to the second light extinction level was defined as the tilt angle θ.

Measurement of Apparent Tilt Angle $\theta_a$.

A one-shot pulse having a threshold value of the liquid crystal was applied to upper and lower substrates. Thereafter, in the absence of an electric field, an FLC element located between crossed Nicol was horizontally rotated with respect to the polarization plate to find a first light extinction level. A one-shot pulse having a polarity opposite to that of the above one-shot pulse was applied to the upper and lower electrodes. Thereafter, in the absence of an electric field, a second light extinction level was found. At this time, an angle which was ½ the angle from the first light extinction level to the second light extinction level was defined as the apparent tilt angle $\theta_a$.

Measurement of Layer Inclination Angle δ

The layer inclination angle δ was measured by an X-ray analyzing method using an X-ray analysis apparatus RAD-IIB (45 kV, 30 mA).

Measurement of Pretilt Angle α

The pretilt angle a was obtained by using a method (crystal rotation method) described in Jpn. J. Appl. Phys. Vo. 19 (1980), No. 10, Short Notes 2013.

More specifically, substrates rubbed parallel to each other but in opposite directions were adhered to each other to form a cell having a thickness of 20 μm, a liquid crystal (A) having an SmA phase in the range of 0° C. to 60° C. was sealed, and a measurement was performed.

A helium neon laser having a polarization plane having an angle of 45° with respect to a rotation axis was radiated on the liquid crystal cell from a direction perpendicular to the rotation axis while the liquid crystal cell was rotated on a plane perpendicular to the upper and lower substrates and including an orientation axis. A beam passing through the cell was transmitted through a polarization plate located at the opposite side and having a light-transmitting axis parallel to an incident polarization plate, and the intensity of the transmitted beam was measured by a photodiode.

An angle formed between a center edge of hyperbolas of the transmitted beam intensities which were formed by interference and a line perpendicular to the liquid crystal cell was defined as $\phi_x$, and this angle was substituted into the following equation to obtain a pretilt angle $\alpha_0$:

$$\sin 2\alpha_0 = \frac{-2\sin\phi_x}{(n_o + n_\theta)\sqrt{(\sin\phi_x/n_o)^2}}$$

where $n_o$ is the refractive index of ordinary light, and $n_a$ is the refractive index of extraordinary light.

As described above, the present inventors found that a display element having a higher contrast than a conventional technique could be obtained by using the uniform states in C1 orientation.

The present inventors also found that when a liquid crystal element having the uniform states of C1 orientation was used, and the following condition was satisfied, the contrast can be further improved and a wider drive margin can be assured.

Of liquid crystal elements having the C1 uniform states, the present inventors found an element having a one-axis orientation state region (i.e., the apparent tilt angle $\theta_a$ is zero in this region) in addition to an element having two stable states at a temperature immediately below the phase transition point during cooling of the element from the smectic A phase to the chiral smectic C phase.

According to another finding of the present inventor, an element having a region exhibiting a uniaxial property in the temperature range below the phase transmission point is selected, and the temperature of this element is further decreased while the uniaxial property is maintained so as to obtain a C1 uniform orientation state having two stable states. This application is better than use of an element in the C1 uniform orientation state without the uniaxial property in favor of an increase in drive margin.

The monostable orientation state preferably falls within the temperature range from a temperature higher than $T_{AC}°$ C. by 2° C. or more when the temperature for causing the phase to transit from the SmA phase to the Sm*C phase is defined as $T_{AC}°$ C.

More preferably, the monostable orientation range more preferably falls within the temperature range from a temperature higher than $T_{AC}°$ C. by 5° C. or more.

According to still another finding of the present inventors as a result of extensive studies, when a liquid crystal having a tilt angle of 10° or less at a temperature 5° C. lower than $T_{AC}°$ C. is used, uniform states tend to occur. A temperature range in which the uniaxial orientation state can be maintained at a temperature below the temperature $T_{AC}$, i.e., the apparent tilt angle $\theta_a$ is set to be zero, can be easily obtained in a liquid crystal which easily assumes uniform states.

Before the present inventors used a liquid crystal exhibiting uniform states in the C1 orientation, they confirmed that when the liquid crystal further satisfied the following condition, a high contrast could be obtained, and a liquid crystal element having a wider drive margin could be provided.

This can provide a liquid crystal element having a high contrast and a wide drive margin when the following chiral smectic liquid crystal is used in the C1 uniform state. This liquid crystal satisfies a condition $T_1/T_2<2.5$ at the same temperature where $T_1$ is the threshold value of the chiral smectic liquid crystal in the C1 uniform state and $T_2$ the threshold value of the chiral smectic liquid crystal in the C2 state.

The C1 uniform state and the C2 state may be mixed in an initial state at the time of production of a liquid crystal element.

This tendency is enhanced when a liquid crystal having a pretilt angle of 6 to 9° and particularly about 8° is used.

A C2 state may be formed in the C1 state by a mechanical means such as pressing. Comparison between the C1 uniform state and the C2 state may be performed in a single liquid crystal element or between different liquid crystal elements.

In a liquid crystal element having a uniform state in the C1 orientation, i.e., in a liquid crystal element whose chiral smectic liquid crystal exhibits an orientation state represented by condition θ<α+δ, the threshold value $T_1$ of the chiral smectic liquid crystal is obtained.

An orientation film of a liquid crustal element exhibiting a uniform state in the C1 orientation is substituted with another orientation film to obtain a liquid crystal element having the C2 orientation, i.e., exhibiting an orientation state wherein the chiral smectic liquid crystal satisfies θ>α+δ. In the resultant liquid crystal element, the threshold value $T_2$ at the same temperature as that for obtaining the threshold value $T_1$ is obtained. A chiral smectic liquid crystal element satisfying condition $T_1/T_2<2.5$ is selected, and a liquid crystal element containing this chiral smectic liquid crystal exhibiting the uniform state in the C1 orientation is used to obtain a liquid crystal element having a high contrast and a wide drive margin.

More specifically, judging from the experimental results, switching between the C1 uniform states stably occurs in a chiral smectic liquid crystal satisfying condition $T_1 \leq T_2$. Even if condition $T_1 \leq T_2$ is satisfied but if condition $T_1/T_2<2.5$ is satisfied, switching between the C1 uniform states can be performed. Condition $T_1/T_2>2.5$ facilitates switching between the C2 splay states. Once switching in the C2 state occurs, switching between the C1 uniform states does not occur.

The threshold values $T_1$ and $T_2$ were measured by the following method. A liquid crystal element was interposed between a pair of crossed Nicol polarizers, and positive and negative rectangular pulsed electric fields were applied between upper and lower substrates to observe switching. In this case, a peak value of each pulsed electric field was determined to be constant, while the pulse width was changed. A pulse width corresponding to perfect switching of the liquid crystal was defined as a threshold value.

A liquid crystal apparatus according to the present invention will be described below. This liquid crystal apparatus uses a method of properly driving a liquid crystal element exhibiting the uniform states in the C1 orientation by using a means for applying scanning signals having two phases, i.e., erase and write phases having different polarities alternately applied to scanning electrodes so that the absolute value of the voltage applied to the pixel of the erase phase is larger than that applied to the pixel of the write phase.

Figure 18:
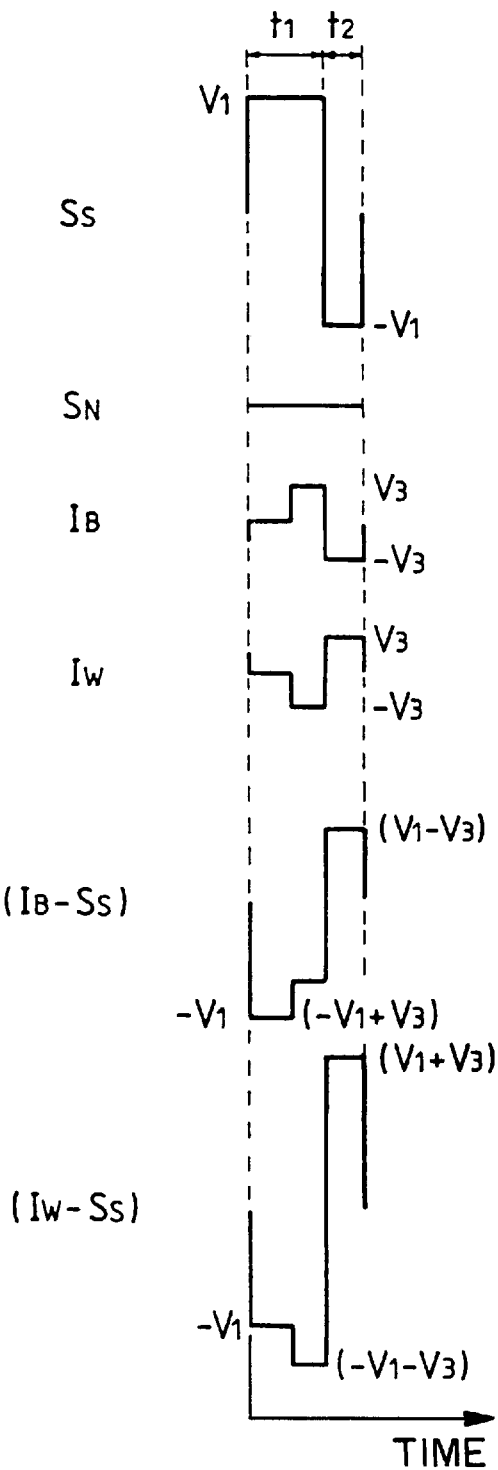
FIG. 18 is a waveform chart of a conventional element.

As compared with multiplex driving (FIG. 18) of an element having the uniform orientation described above, problems posed by a drive margin can be greatly improved to obtain a liquid crystal element capable of displaying a good image.

A detailed arrangement of the scanning signal applying means according to the present invention will be described below.

Figure 9:
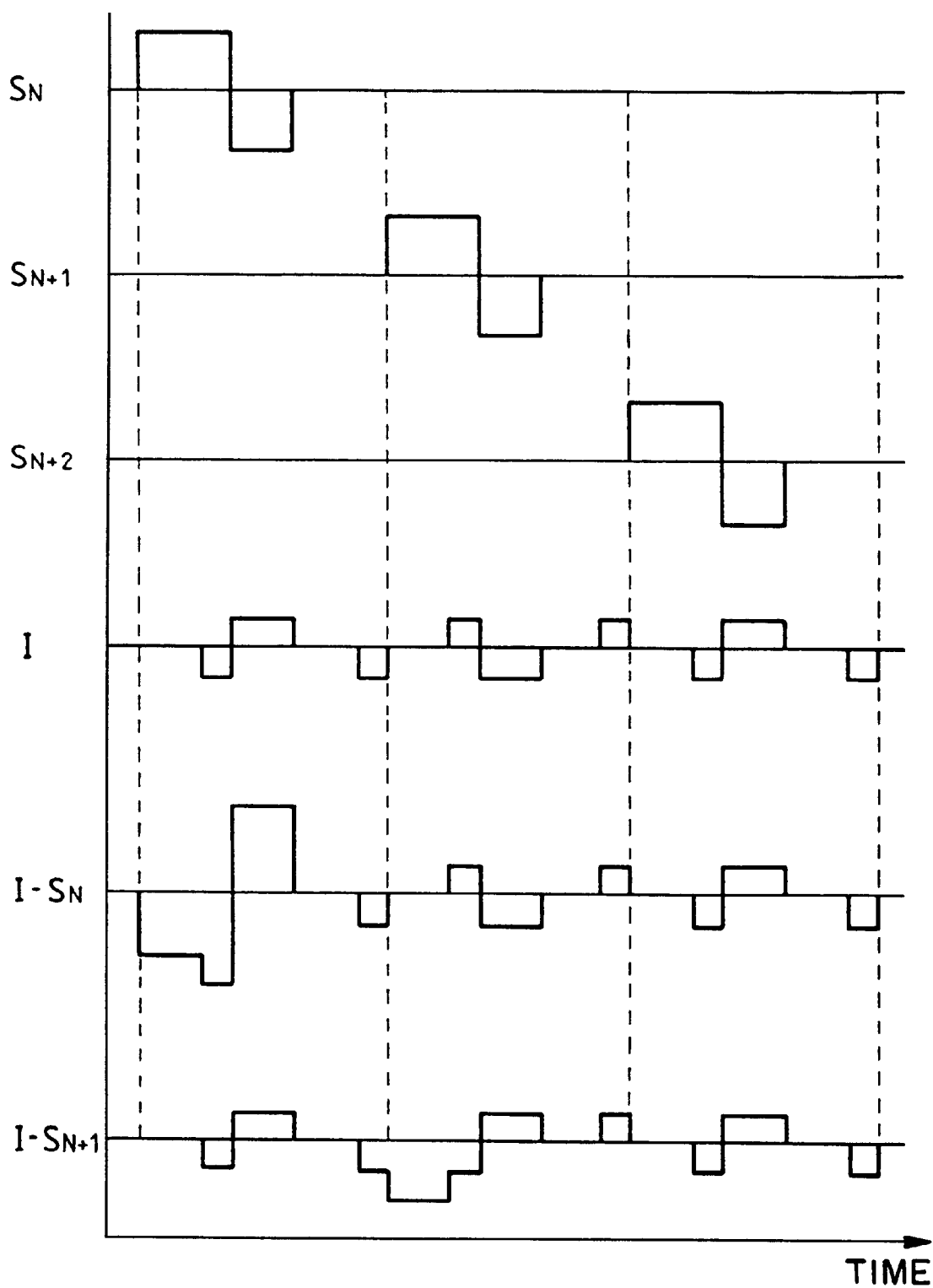
FIG. 9 is a timing chart showing a drive waveform applied to the liquid crystal element.
Figure 12A:
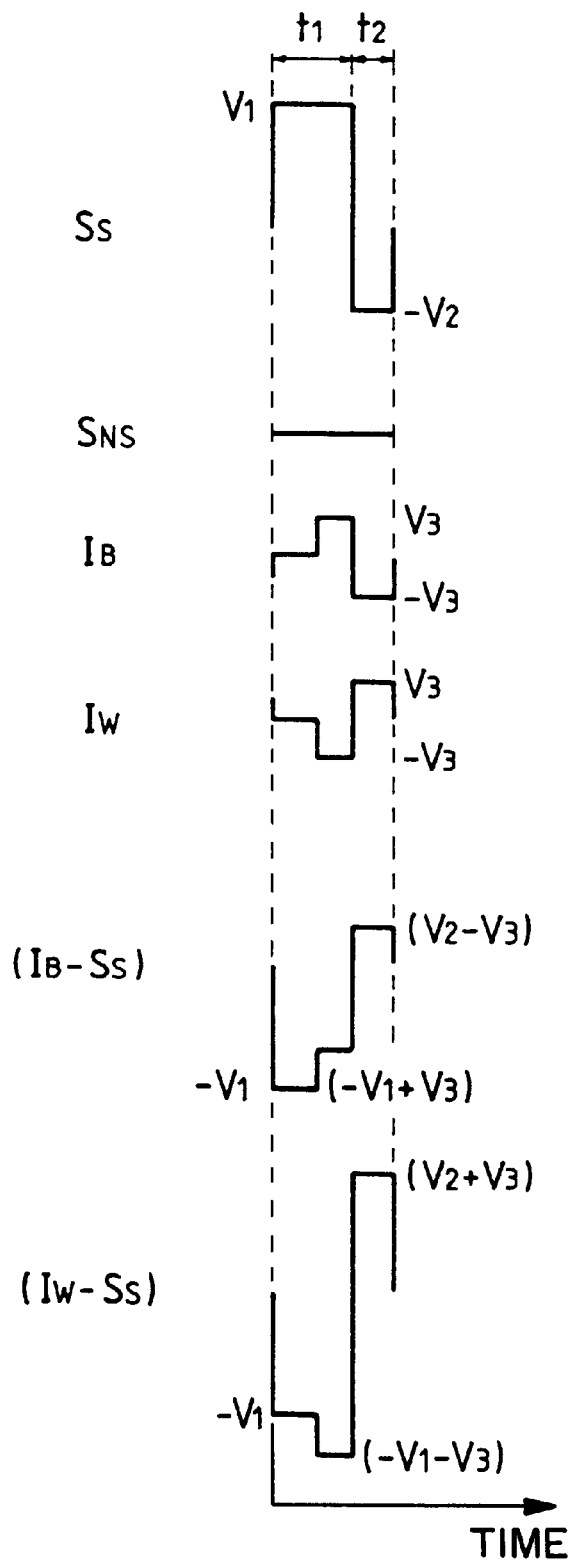
FIGS. 12A and 12B are waveform charts of drive voltages of multiplex driving employed in the liquid crystal apparatus of the present invention.
Figure 12B:
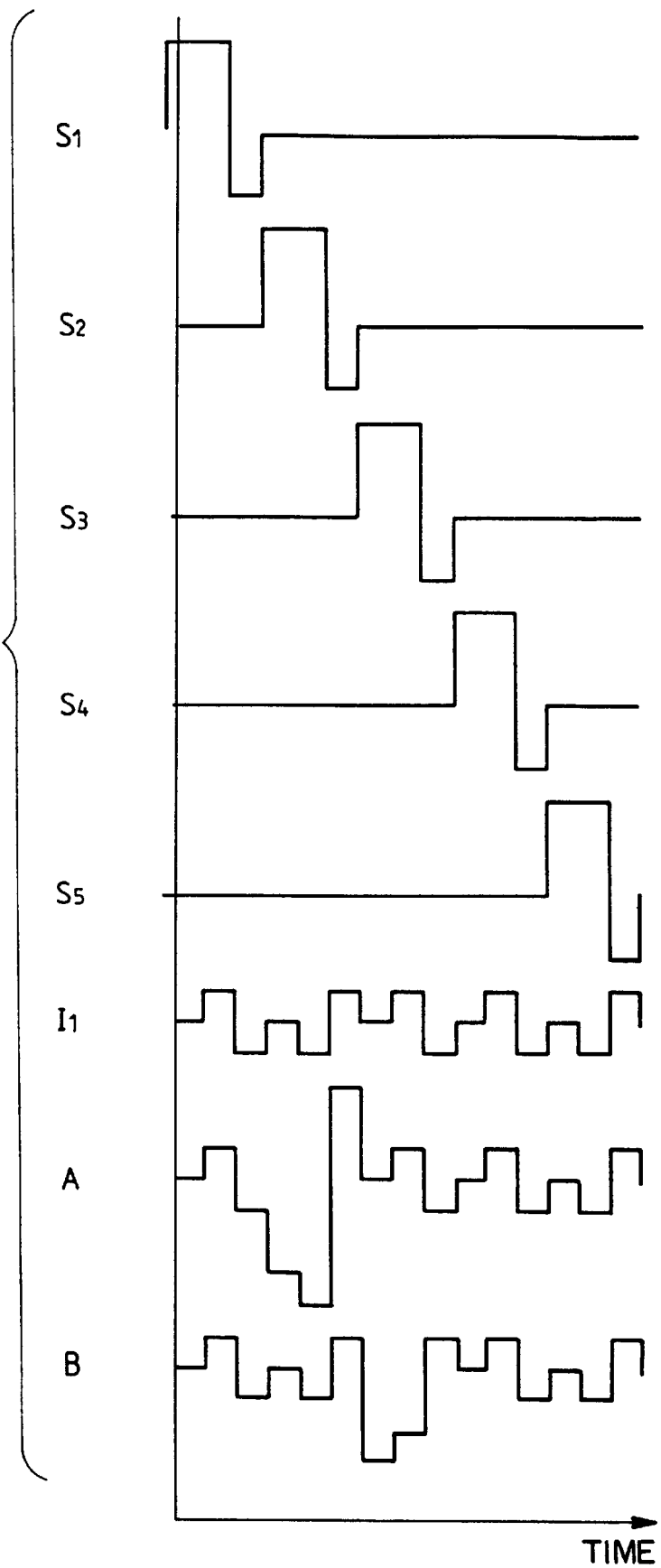
Figure 13:
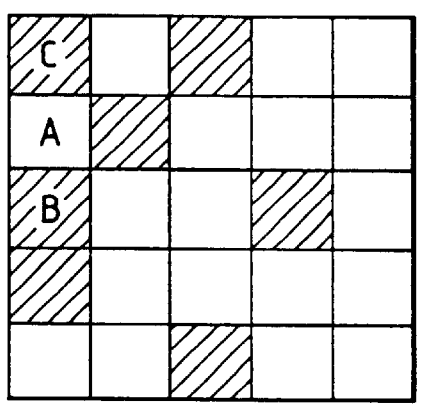
FIG. 13 is a view showing a display according to an embodiment of the present invention.

FIG. 12A shows drive waveforms according to the present invention, and FIG. 12B is a timing chart for displaying a pixel pattern shown in FIG. 9 by using this drive waveforms.

Referring to FIG. 12A, the drive waveforms are a scanning selection signal waveform $S_S$, a scanning nonselection signal waveform $S_{NS}$, a white write signal waveform $I_W$, and a black write signal waveform $I_a$. In this driving scheme, $V_1: V_2: V_3 = 3:2:1$ $t_1: t_2 = 2:1$ are given. If $V_1: V_2: V_3=3:3:1$ is established, giving is equal to that of a conventional case in FIG. 18.

According to an experiment of the prevent inventors, in a semi-selection state (IB–$S_S$), erasure is interfered by a semi-selection pulse upon application of an erase pulse to cause an insufficient drive margin of the drive waveform of the conventional case, and crosstalk occurs. It is apparent that a strong erase state is required for write access in the uniform orientation, and therefore the absolute value of the voltage of the erase phase is set to be larger than that of the write phase.

If only the erase process is to be strongly performed, the voltage value of the erase phase is set to be equal to that of the write phase, and the pulse width $t_1$ of the erase phase can be set to be larger than the pulse width $t_2$ of the write phase. However, an increase in pulse width $t_1$ is not preferable because the one-line selection period is prolonged and the frame frequency is undesirably decreased.

The present invention will be described in detail by way of its examples and comparative examples. However, the present invention is not limited to the particular examples to be described below.

EXAMPLE 1

A thin film of tantalum oxide was formed by sputtering on a glass plate having a transparent electrode thereon, and a 1% NMP solution of a polyamic acid LQ1802 (tradename) available from Hitachi Chemical Co., Ltd. was applied to the thin film by a spinner and sintered for an hour at 270° C. The resultant substrate was rubbed, and another substrate subjected to the same treatment described above was also prepared such that rubbing directions were the same parallel directions. These substrates were bonded while being spaced apart from each other by a gap of 1.5 μm to prepare a cell. A pretilt angle of this cell was measured to be 14° according to a crystal rotation method. A ferroelectric liquid crystal as a liquid crystal mixture containing phenyl pyrimidine as a major constituent was sealed in the cell. In this case, the ferroelectric liquid crystal had a tilt angle of 12° at room temperature and a layer inclination angle of 10° at room temperature. Phase transition temperatures were given as follows:

| –20° C. | 45° C. | 70° C. | 78° C. |
|---|---|---|---|
| Crystal ← Sc* ← $S_A$ ← Ch ← Iso | | | |

Figure 7:
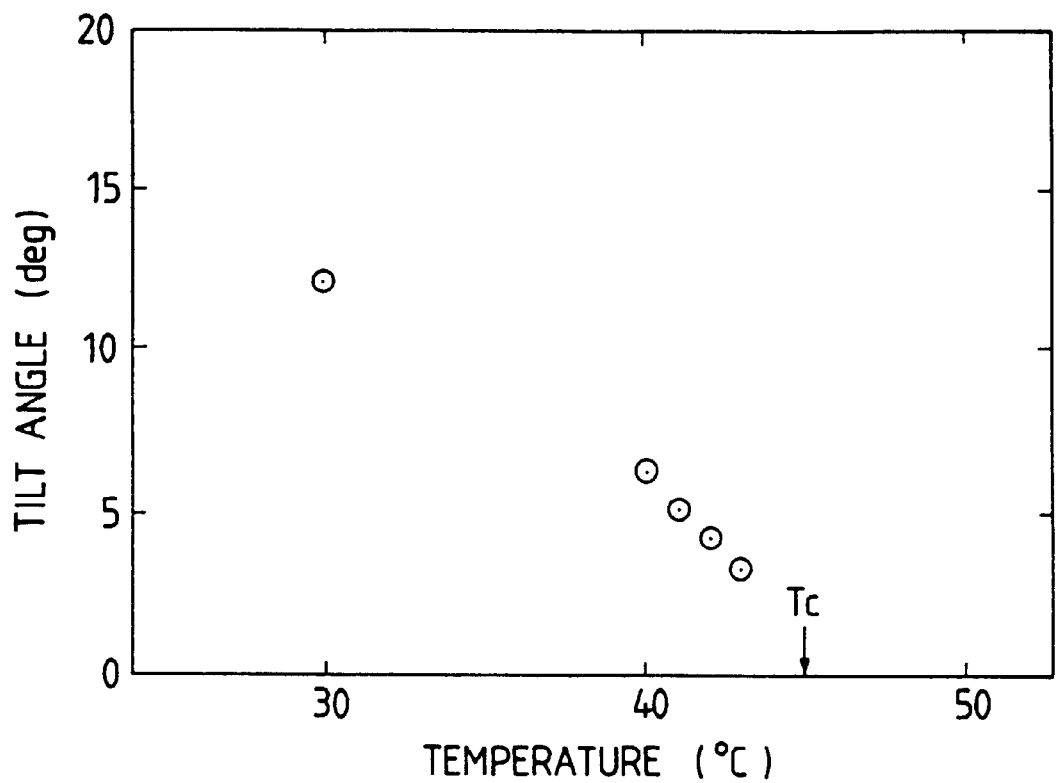
FIG. 7 is a graph showing changes in tilt angles of a liquid crystal element as a function of temperature according to an embodiment of the present invention.

FIG. 7 shows changes in tilt angles of the liquid crystal as a function of temperature.

Figure 8:
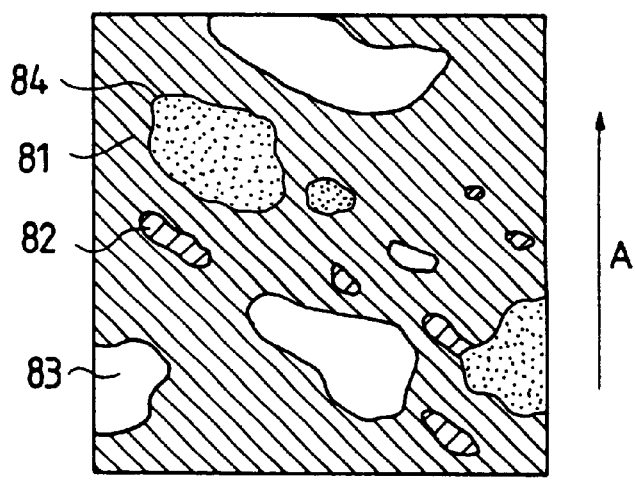
FIG. 8 is a view illustrating a mixing state of four states in the liquid crystal element.

The cell injected with the liquid crystal was aged for an hour at 100° C. and was observed while the temperature was decreased within the range of the Sc* phase. The C1 orientation was maintained in the entire temperature range, and phase transitions between the four states could be performed using an electric field. FIG. 8 shows splay states 81 and 82 and uniform states 83 and 84 of a cell having four mixed states observed with a polarizing microscope. An apparent tilt angle between two splay states was 5°, and an apparent tilt angle between two uniform states was 10°. When a rectangular pulse having a peak value of 24 V was applied to the cell, switching occurred between the splay states with a pulse width of 20 μm, and switching between the uniform states occurred with a pulse width of 60 μs.

Display characteristics in the uniform state were evaluated.

The liquid crystal cell was interposed between a pair of 90° crossed Nicol polarizers, and a 30 V pulse of 50 μsec was applied to set the crossed Nicols in a light extinction level (i.e., the darkest state). At this time, a transmittance was measured by a photomultiplier. Subsequently, a –30 V pulse of 50 μsec was applied to the cell to measure a transmittance (bright state) in the same manner as described above. The transmittance in the dark state was 0.2%, while the transmittance in the bright state was 10%. Therefore, a contrast ratio was 50:1.

Figure 10:
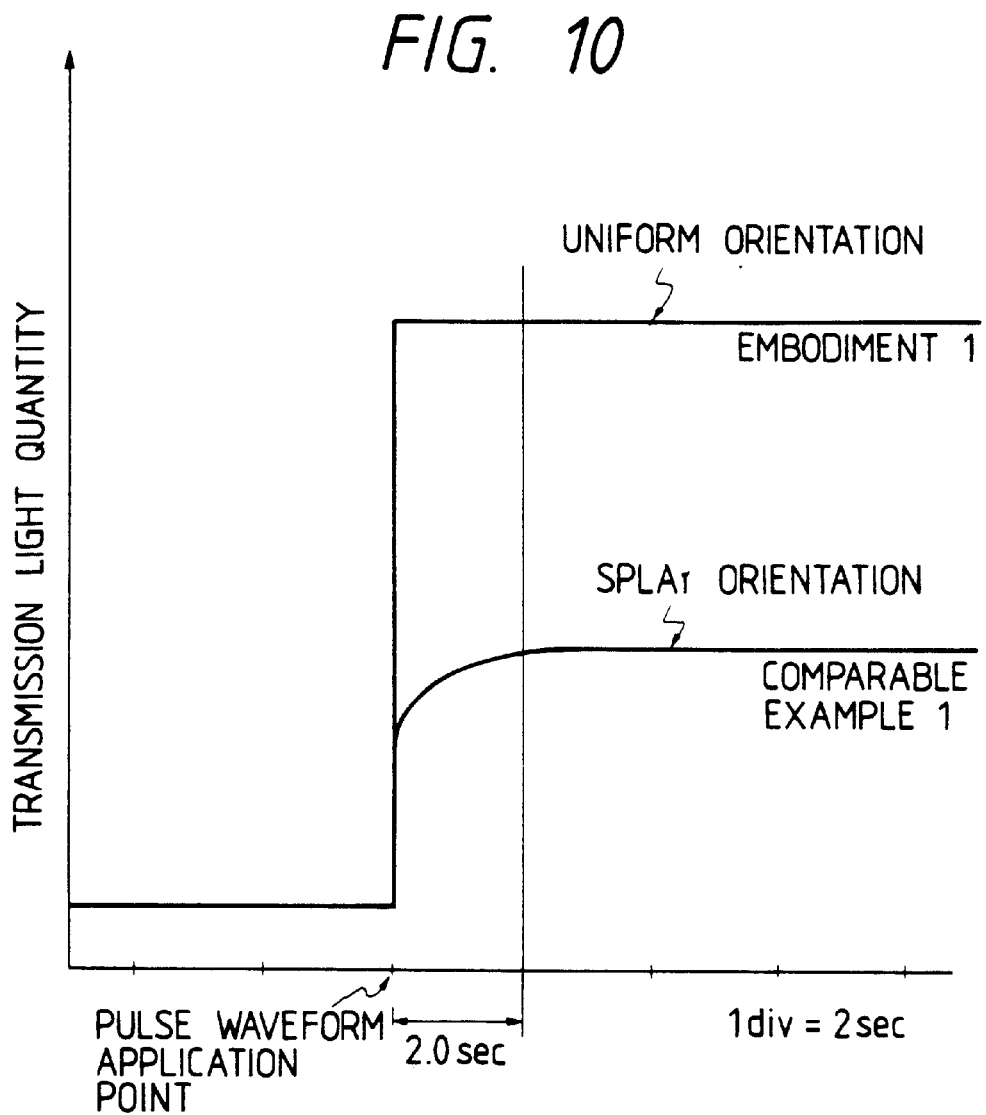
FIG. 10 is a graph showing comparison between measurement results of optical characteristics of a uniform orientation state of the embodiment and measurement results of optical characteristics of a comparative example.

An optical response time (i.e., a change in transmitted light amount of 0 to 97%) was measured to be 0.1 sec (FIG. 10). High-speed switching could be achieved.

Stripe-like electrodes were formed on the upper and lower substrates to form a matrix display panel having the same arrangement as described above except that pixels were formed at intersections between the stripe-like electrodes. When the drive waveforms in FIG. 9 were applied to the display panel, a good operation was performed. The drive waveforms in FIG. 9 are scanning electrode voltage waveforms $S_N$ and $S_{N+1}$, a signal electrode voltage waveform I, and a pixel voltage waveform I-$S_N$.

EXAMPLE 2

Another liquid crystal (tilt angle: 21° at room temperature; inclination angle: 17° at room temperature) containing phenyl pyrimidine as a major constituent was sealed in a cell having the same orientation film as in Example 1. Although this cell could be set in the uniform states in C1 orientation, the splay states were mostly present in the cell at room temperature upon application of matrix drive waveforms. However, when this cell was used at a temperature of 55° C. or more (tilt angle: 11° at 55° C.; inclination angle: 9° at 55° C.), the uniform states were stably present in the cell. The phase transition temperatures of this liquid crystal were as follows:

| −26° C. | 60° C. | 73° C. | 90° C. |
|---|---|---|---|
| Crystal ← Sc* ← $S_A$ ← Ch ← Iso | | | |

When this cell was used at high temperatures and the inclination angle was set to be small, and if condition (5) or (6) was satisfied, stable uniform states could be obtained, which could be optimally utilized for matrix driving with a high contrast.

COMPARATIVE EXAMPLE 1

A liquid crystal cell was prepared following the same procedures as in Example 1 except that an LP64 (tradename) available from TORAY INDUSTRIES, INC. was used for an orientation film having a small pretilt angle, and a liquid crystal (tilt angle: 17° at room temperature; inclination angle: 13.5° at room temperature) was sealed in the cell. A C2 orientation state was obtained.

A pretilt angle of the cell was measured to be 2.5° according to a crystal rotation method.

A transmittance in a dark state was 1%, and a transmittance in a bright state was 6%, so that a contrast ratio was 6:1. An optical response time was 2.0 sec (FIG. 10).

EXAMPLE 3

A thin film of tantalum oxide was formed by sputtering on a glass plate having a transparent electrode thereon, and a 1% NMP solution of a polyamic acid LQ1802 (tradename) available from Hitachi Chemical Co., Ltd. was applied to the thin film by a spinner and sintered for an hour at 270° C. The resultant substrate was rubbed, and another substrate subjected to the same treatment described above was also prepared such that rubbing directions were the same parallel directions. These substrates were bonded while being spaced apart from each other by a gap of 1.5 µm to prepare a cell. A pretilt angle of this cell was measured to be 12.5° according to a crystal rotation method. A ferroelectric liquid crystal as a liquid crystal mixture containing phenyl pyrimidine as a major constituent was sealed in the cell. In this case, the ferroelectric liquid crystal had a tilt angle of 12.4° at room temperature and a layer inclination angle of 10° at room temperature. Phase transition temperatures were given as follows:

| | −14° C. | 47° C. | 73° C. | 81° C. |
|---|---|---|---|---|
| Crystal ← Sc* ← $S_A$ ← Ch ← Iso | | | | |
| Crystal Phase | Chiral Smactic Phase | Smactic A Phase | Cholesteric Phase | Isotropic Phase |

Figure 16:
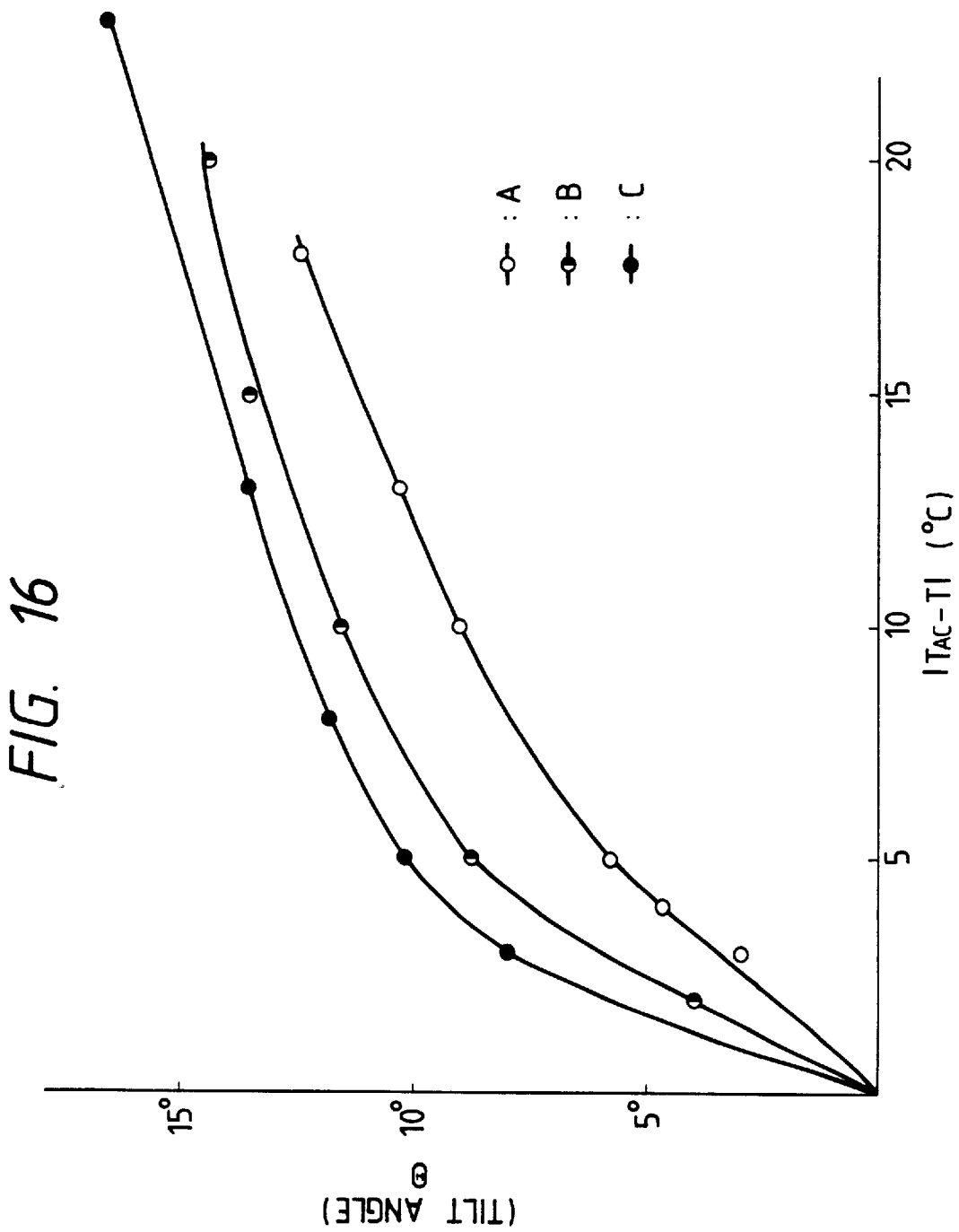
FIG. 16 is a graph showing changes in tilt angles of the liquid crystal elements of this embodiment and the comparative example as a function of temperature.
Figure 17:
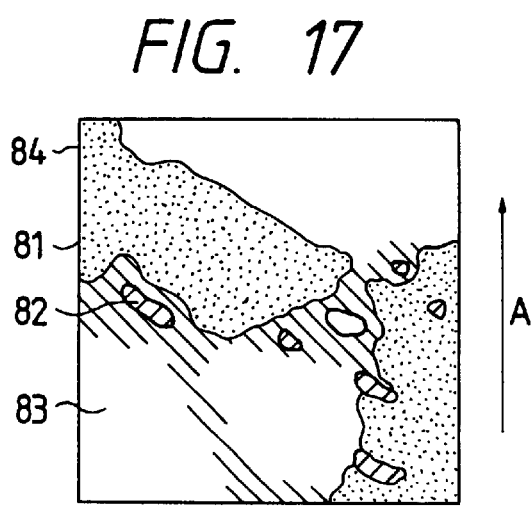
FIG. 17 is a view showing a state wherein four states are mixed in the liquid crystal element of the present invention.

FIG. 16 shows a curve A representing changes in tilt angles of the liquid crystal as a function of temperature. The cell injected with the liquid crystal was aged for 5 hours at 100° C. and was gradually cooled at a rate of 1° C./minute while being observed with a microscope. The liquid crystal assumed a uniaxial orientation state up to 41° C. in the Sc* phase. A temperature for causing a phase transition to two stable states was lower than the $T_{AC}$ point by 6° C. When further observation was performed while the temperature was further decreased within the range of the Sc* phase, the C1 orientation was maintained in the entire temperature range, and transitions between the four states by electric fields could be performed. FIG. 17 shows splay states 81 and 82 and uniform states 83 and 84 of a cell having four mixed states observed with a polarizing microscope. When the initial orientation state was observed at room temperature, the initial state consisted of about 90% of uniform states and about 10% of splay states. An apparent tilt angle between two splay states was 5°, and an apparent tilt angle between two uniform states was 10.7°. When a rectangular pulse having a peak value of 24 V was applied to the cell, switching occurred between the splay states with a pulse width of 20 µm, and switching between the uniform states occurred with a pulse width of 60 µs.

Stripe-like electrodes were formed on the upper and lower substrates having the identical structures to form pixels at the intersections, thereby forming a matrix display panel. When the drive waveforms of FIG. 9 were applied to the matrix display panel, the matrix display panel was properly operated within a wide temperature range of 37° C. to 5° C. In FIG. 9, the drive waveforms are scanning voltage waveforms $S_N$ and $S_{N+1}$, a signal electrode voltage waveform I, and a pixel voltage waveform I-$S_N$.

COMPARATIVE EXAMPLE 2

A liquid crystal cell was prepared following the same procedures as in Example 3 except that SP710 (tradename) available from TORAY INDUSTRIES. INC. was used for an orientation film. A ferroelectric liquid crystal used in Example 3 was injected in the liquid crystal cell. A pretilt angle of the cell was 0°, and the tilt and inclination angles of Comparative Example 2 were equal to those in Example 3.

When the liquid crystal cell was gradually cooled at a rate of 1° C./minute from 100° C., the uniaxial orientation was maintained from 78° C. to 45° C. A temperature at which the uniaxial orientation state disappeared was the $T_{AC}$ point. When the liquid crystal element was further gradually cooled while being observed with a microscope, a phase transition from the C1 orientation to the C2 orientation occurred at 44° C. This liquid crystal element is not suitable for a display utilizing the C1 uniform orientation state. An apparent tilt angle measured at 30° C. was 5°.

EXAMPLE 4

A ferroelectric liquid crystal having the following phase transitions was sealed in a cell formed following the same procedures as in Example 3 to prepare a liquid crystal element. In this case, a pretilt angle was 12.5°, a tilt angle was 14.4°, and a layer inclination angle was 11.5°.

| −9° C. | 50° C. | 74° C. | 86° C. |
|---|---|---|---|
| Crystal ← Sc* ← $S_A$ ← Ch ← Iso | | | |

The liquid crystal element was aged following the same procedures as in Example 3 and was gradually cooled while being observed with a microscope. The uniaxial orientation was maintained up to 47° C. lower than the $T_{AC}$ point corresponding to the Sc* phase by 3° C. When the phase of the liquid crystal was observed at 30° C., the C1 orientation was maintained, and phase transitions between the four states by electric fields could be performed. An apparent tilt angle between two splay states was 5°, and an apparent tilt angle between two uniform states was 13.3°. When a rectangular pulse having a peak value of 24 V was applied to the cell, switching occurred between the splay states with a pulse width of 18 µm, and switching between the uniform states occurred with a pulse width of 95 µs.

A matrix display panel was prepared following the same procedures as in Example 3, and drive waveforms as in Example 3 were applied to the display panel. The display panel was properly operated in the temperature range of 40° C. to 25° C.

COMPARATIVE EXAMPLE 3

A ferroelectric liquid crystal having the following phase transitions was sealed in a cell formed following the same procedures as in Example 3 to prepare a liquid crystal element. In this case, a tilt angle was 16.7°, a layer inclination angle was 13.5°, and a pretilt angle was 12.5°.

| −4.6° C. | 53° C. | 74.2° C. | 89.0° C. |
|---|---|---|---|
| Crystal ← Sc* ← $S_A$ ← Ch ← Iso | | | |

A curve C in FIG. 16 represents changes in tilt angles of the liquid crystal as a function of temperature. The liquid crystal element was aged following the same procedures as in Example 3 and was gradually cooled while being observed with a microscope. Uniaxial orientation was maintained up to the same temperature as the $T_{AC}$ point. When the phase of the liquid crystal was observed at 30° C., the cell was set in the perfect splay orientation state while C1 orientation was maintained. Although switching between the four states by electric fields could be performed, a phase transition between the two uniform states was hard to cause. When a rectangular pulse having a peak value of 24 V was applied to the cell, switching between the splay states occurred with a pulse width of 16 µm, and switching between the uniform states occurred with 400 µm. An apparent tilt angle between two splay states was 5°, and an apparent tilt angle between two uniform states was 16.5°.

A matrix display panel was prepared following the same procedures as in Example 3, and drive waveforms as in Example 3 were properly operated only within a narrow temperature range of 48° C. to 40° C.

As is apparent from Examples 3 and 4 and Comparative Examples 2 and 3, when orientation films having large pretilt angles are combined with liquid crystals and when uniaxial orientation is maintained within the temperature range lower than the $T_{AC}$ point, uniform orientation is properly maintained, and the cell can be properly operated between the two uniform states.

EXAMPLE 5

500-Å thick thin films of tantalum oxide were formed on two glass substrates having stripe-like transparent electrodes, respectively, by sputtering, and a 1% NMP solution of a polyamic acid LQ1802 (tradename) available from Hitachi Chemical Ltd. was applied to the thin films by a spinner. The resultant structures were sintered for an hour at 270° C. The 100-Å thick polyimide films respectively formed on the substrates were rubbed, and silica beads having an average grain size of 1.5 µm were placed on one substrate. The two glass substrates were stacked on each other such that upper and lower transparent electrodes were perpendicular to each other and the upper and lower rubbing directions are the same parallel directions to prepare a cell (to be referred to as a cell A hereinafter). Similarly, a cell (to be referred to as a cell B hereinafter) was prepared following the same procedures as described above except that the polyamic acid was "LP64" (tradename) available from TORAY INDUSTRIES, INC. and a 2% solution of NMP/n-butyl cellosolve=2/1 (weight ratio) was used to form a polyimide orientation film.

A pretilt angle of the cell A was 12°, and a pretilt angle of the cell B was 2.5°. When a liquid crystal (θ=11.1°; δ=8.20) containing phenyl pyrimidine as a major constituent was injected and sealed in the cells A and B, the C1 orientation state was set in the cell A, while the C2 orientation state was set in the cell B.

Positive and negative rectangular pulses having a peak value of 25 V were applied to these cells, and threshold values were measured (threshold measurement temperature: 30° C). Switching between the uniform states occurred in the cell A with 30 µsec, and switching in the C2 orientation state occurred in the cell B with 35 µsec. In this case, a ratio a of the pulse width threshold value of the cell A to that of the cell B was 0.86 in accordance with the following calculation:

$$a = \frac{\text{Threshold Value of Cell A of Uniform State}(T_1)}{\text{Threshold Value of Cell B of Uniform State}(T_1)}$$

Drive waveforms shown in FIG. 12 were applied to the following conditions, and multiplexing driving of the cell was performed:

$V_1:V_2:V_3=3:2:1$ $t_1:t_2:t_3=3:2:3$ $V_{cp}=|V_1+V_3|=25$ V

In this case, a high-contrast display was obtained during a scanning selection period ($t_1+t_2+t_3$) of 200 µsec to 290 µsec.

That is, when a range of the scanning selection period capable of performing an image display is defined from $t_a$ to $t_b$ ($t_b>t_a$), and a drive margin M is defined as follows:

$$M = \frac{t_b - t_a}{t_b + t_a}$$

the drive margin M was 0.18.

The display characteristics of the cell A in the uniform states were evaluated.

More specifically, after the liquid crystal cell A was interposed between a pair of 90° crossed Nicol polarizers, a 30 V pulse of 50 μsec was applied to set the 90° crossed Nicols in a light extension level (darkest state). At this time, a transmittance was measured by a photomultiplier. Subsequently, a −30 V pulse of 50 μsec was applied to the cell, and a transmittance (bright state) was measured in the same manner as described above. The transmittance in the dark state was 0.5%, and the transmittance in the bright state was 10%. Therefore, a contrast ratio was 50:1.

EXAMPLE 6

Another liquid crystal ($\theta=12.1°$, $\delta=9.7°$) containing phenyl pyrimidine and an ester as major constituents was injected and sealed in each of cells A and B following the same procedures as in Example 5. The C1 orientation state was set in the cell A, while the C2 orientation state was set in the cell B. When measurements were performed following the same procedures as in Example 5, switching occurred in the cell A with 60 μsec, switching occurred in the cell B with 41 μsec, and a ratio a was 1.5.

A drive margin of the cell A was measured following the same procedures as in Example 5. A high-contrast display was obtained during the scanning selection period of 260 μsec to 420 μsec. The drive margin was M=0.24.

COMPARATIVE EXAMPLE 4 & 5

Liquid crystals ① and ② each containing phenyl pyrimidine as a major constituent were sealed in cells A and B, and threshold values of the cells A and B were measured, the results of which are shown in Table 4 below. The liquid crystals ① and ② were set in the C1 orientation states in the cell A and the C2 orientation states in the cell B.

TABLE 4

| | $\theta$ | $\delta$ | Threshold Value in Cell A | Threshold Value in Cell B | Threshold Value Ratio (a) | Margin (M) in Cell A |
|---|---|---|---|---|---|---|
| ① | 12.4° | 10.7° | 135 μsec | 43 μsec | 3.1 | 0.0 |
| ② | 16.8° | 16.5° | 362 μsec | 39 μsec | 9.3 | 0.0 |

In the cell A, when the drive margins of the liquid crystals ① and ② were measured following the same procedures as in Example 5, a high-contrast display cannot be performed, and M=0.0.

EXAMPLE 7

Liquid crystals as in Example 5 were sealed in a cell (to be referred to as a cell C hereinafter) prepared following the same procedures as in example 5 except that rubbing directions were shifted by 6° between upper and lower substrates, and drive margins were measured following the same procedures as in Example 5.

In this case, a high-contrast display could be obtained when the scanning selection period fell within the range of 170 μsec to 305 μsec. In this case, the margin M=0.28 was obtained.

EXAMPLE 8

A threshold value of a liquid crystal having a cone angle $\theta=12.4°$ and a layer inclination angle $\delta=10.7°$ was measured following the same procedures as in Example 5. Switching in the cell A was performed with 70 μsec, and switching in the cell B was performed with 36 μsec. A threshold value ratio was given as α=1.9.

This liquid crystal was injected and sealed in the cell C shown in Example 7, and a drive margin was measured following the same procedures as in Example 5. In this case, a high-contrast display was performed when the scanning selection period fell within the range of 510 μsec to 990 μsec. In this case, the margin M=0.32 was obtained.

EXAMPLE 9

A threshold value of a liquid crystal having a cone angle $\theta=14.6°$ and a layer inclination angle $\delta=13.0°$ was measured following the same procedures as in Example 5. Switching in the cell A was performed with 95 μsec, and switching in the cell B was performed with 39.5 μsec. A threshold value ratio was given as a=2.4.

This liquid crystal was injected and sealed in the cell C shown in Example 7, and a drive margin was measured following the same procedures as in Example 5. In this case, a high-contrast display was performed when the scanning selection period fell within the range of 1.0 msec to 1.3 msec. In this case, the margin M=0.13 was obtained.

COMPARATIVE EXAMPLE 6

The liquid crystal ② in Comparative Example 5 was injected and sealed in the cell C shown in Example 7, and a drive margin was measured following the same procedures as in Example 5. A high-contrast display was not performed, and M=0.0.

EXAMPLE 10

A cell D was prepared following the same procedures as in Example 5 except that a polyamic acid was directly applied to glass substrates each having stripe-like transparent electrodes. A pretilt angle was α=8°. When a liquid crystal ($\theta=10.8°$, $\delta=8.7°$) containing phenyl pyrimidine and an ester as major constituents was injected and sealed in the cell D, most of the cell was set in the C1 orientation. Defects were formed in part of the cell, and C2 orientation occurred using these defects as a boundary. A threshold value was measured following the same procedures as in Example 5. A threshold value of the C1 orientation portion was 35.5 μsec, and a threshold value of the C2 orientation portion was 27 μsec (a=1.3).

A drive margin was measured using the C1 orientation portion of the liquid crystal element following the same procedures as in Example 5. A high-contrast display was performed during the scanning selection period of 240 μsec to 360 μsec. In this case, the margin M=0.2 was obtained.

COMPARATIVE EXAMPLE 7

When a liquid crystal ($\theta=12.5°$, $\delta=10.5°$) containing phenyl pyrimidine as a major constituent was injected and sealed in the cell D shown in Example 10, C1 and C2 orientation portions were obtained as in Example 10. A threshold value of the C1 orientation portion was 170 μsec, and a threshold value of the C2 orientation portion was 50 μsec. The ratio a=3.4 was obtained.

When a drive margin of this liquid crystal was measured following the same procedures as in Example 10, a high-contrast display was not performed, and the margin was M=0.0.

EXAMPLE 11

A thin film of tantalum oxide was formed by sputtering on a glass plate having a transparent electrode thereon, and a 1% NMP solution of a polyamic acid LQ1802 (tradename) available from Hitachi Chemical Co., Ltd. was applied to the thin film by a spinner and sintered for an hour at 270° C. The resultant substrate was rubbed, and another substrate subjected to the same treatment described above was also prepared such that rubbing directions were the same parallel directions. These substrates were bonded while being spaced apart from each other by a gap of 1.5 μm to prepare a cell. A pretilt angle of this cell was measured to be 14° according to a crystal rotation method. A ferroelectric liquid crystal as a liquid crystal mixture containing phenyl pyrimidine as a major constituent was sealed in the cell. In this case, the ferroelectric liquid crystal had a tilt angle of 12° at room temperature and a layer inclination angle of 10° at room temperature. Phase transition temperatures were given as follows:

| −20° C. | 45° C. | 70° C. | 78° C. |
|---|---|---|---|
| Crystal ← Sc* ← $S_A$ ← Ch ← Iso | | | |

A display area of the panel of this cell was 114×228 mm.

Display characteristics in the uniform state were evaluated.

The liquid crystal cell was interposed between a pair of 90° crossed Nicol polarizers, a 30 V pulse of 50 μsec was applied to set the crossed Nicols in a light extinction level (i.e., the darkest state). At this time, a transmittance was measured by a photomultiplier. Subsequently, a −30 V pulse of 50 μsec was applied to the cell to measure a transmittance (bright state) in the same manner as described above. The transmittance in the dark state was 0.5%, while the transmittance in the bright state was 10%. Therefore, a contrast ratio was 50:1, i.e., a good contrast was obtained.

Drive waveforms shown in FIG. 12 were applied to the following conditions, and multiplexing driving of the ferroelectric liquid crystal cell was performed:

$V_1:V_2:V_3=3:2:1$ $t_1:t_2=2:1$ $V_{cp}=|V_1+V_3|=25$ V

In this case, a good image could be displayed when the pulse width $t_2$ fell within the range of 80 to 180 μsec at room temperature.

That is, when a range of the scanning selection period capable of performing an image display is defined from $t_a$ to $t_b$ ($t_b>t_a$), and a drive margin M is defined as follows:

$$M = \frac{t_b - t_a}{t_b + t_a}$$

the drive margin M was 0.38.

As compared with image formation under the condition that $V_1:V_2:V_3=3:3:1$ was set, a stable, normal display could be obtained on the entire screen.

EXAMPLE 12

Figure 14A:
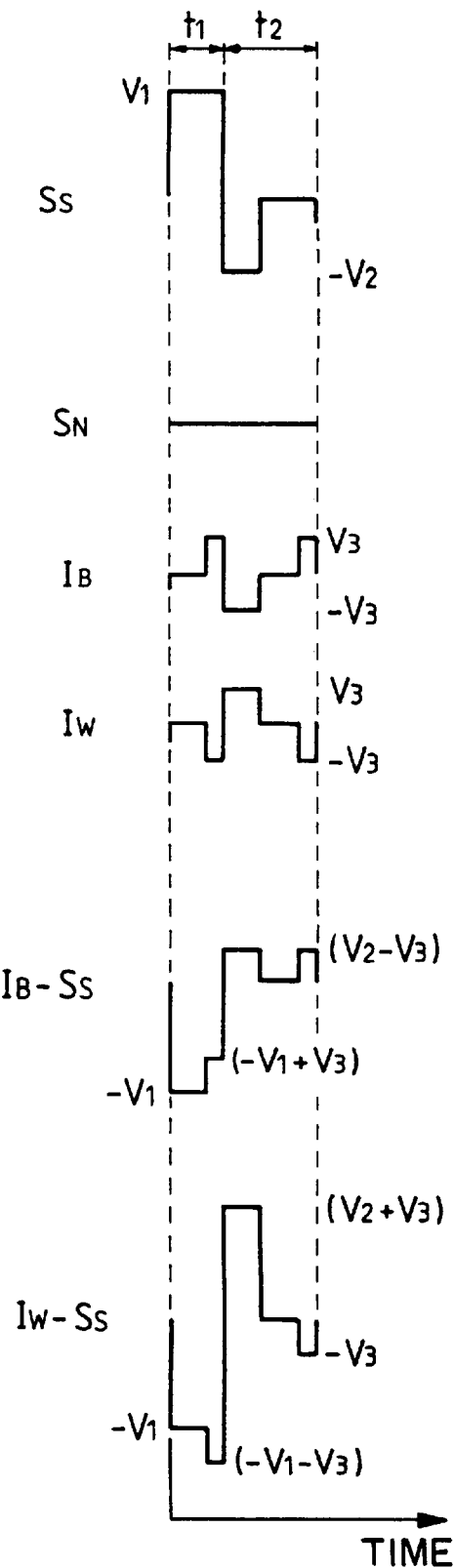
FIGS. 14A and 14B and FIG. 15 are waveform charts showing drive waveforms preferably used in the present invention.
Figure 14B:
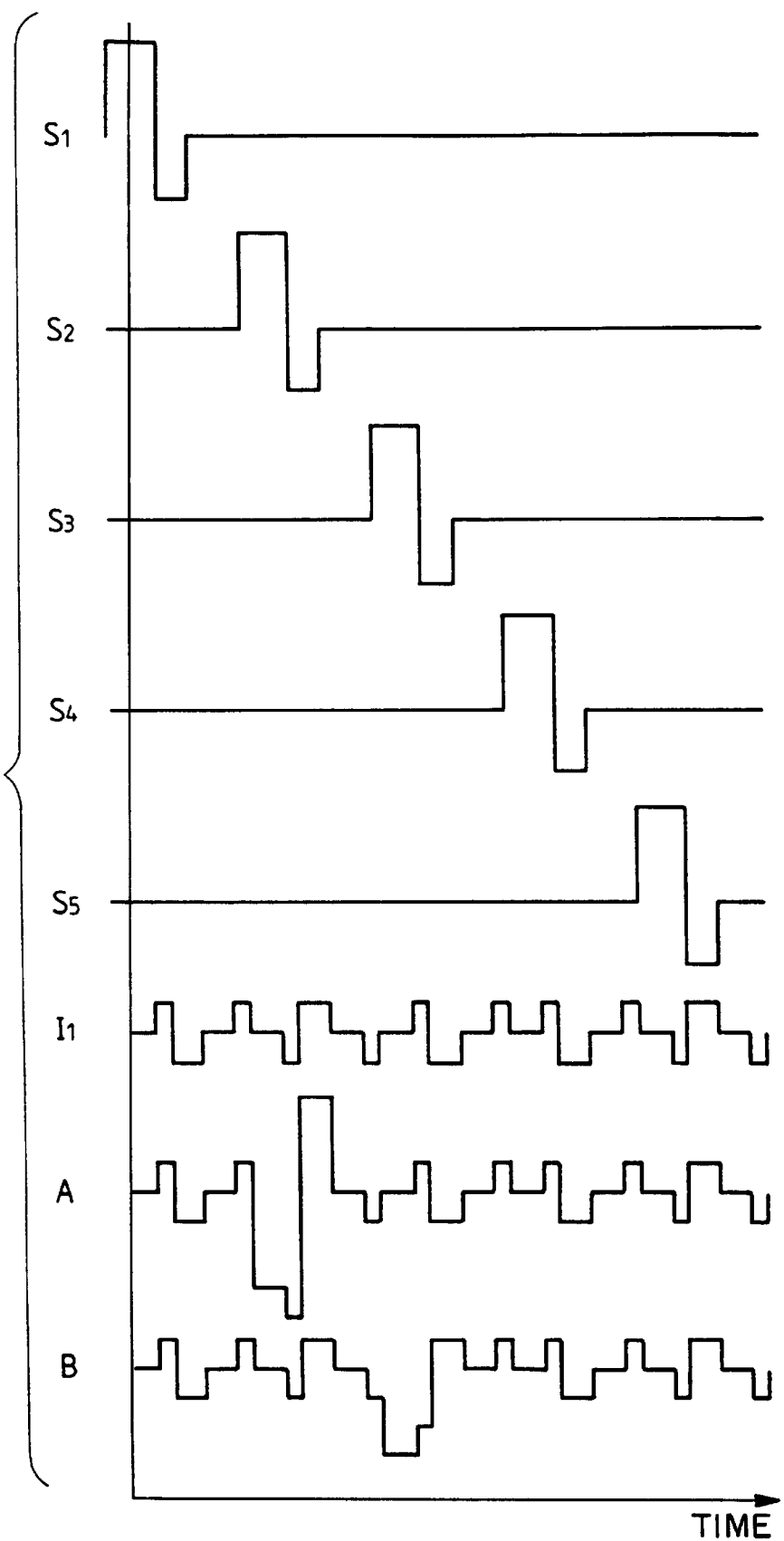

An image was formed following the same procedures as in Example 11 except that drive waveforms shown in FIG. 14A were used, a display panel was driven in accordance with timings shown in FIG. 14B, and $t_1:t_2=3:2$ was set. In this case, a good display could be obtained, and M=0.33 was obtained. Flickering of the image was greatly reduced by these drive waveforms as compared with Example 11.

EXAMPLE 13

Figure 15:
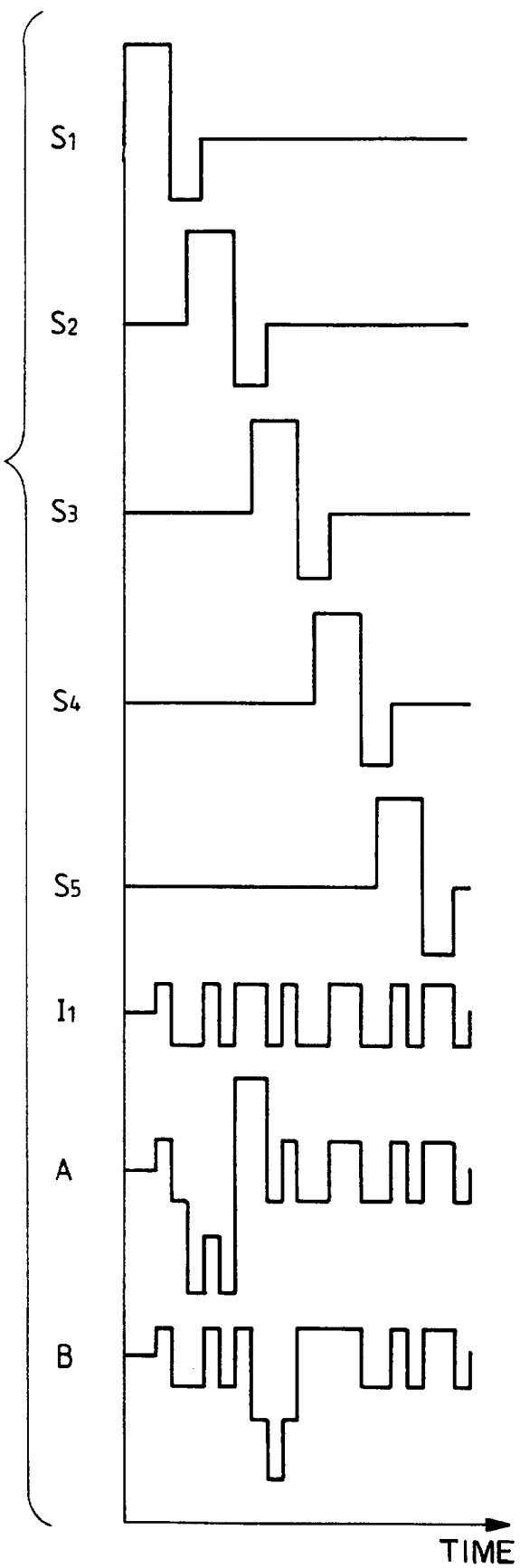

An image was formed following the same procedures as in Example 12, except that drive waveforms in FIG. 15 were used. In this case, a good display could be obtained, and M=0.30 was obtained. In these drive waveforms, the frame frequency was increased by about 1.7 times as compared with Example 12.

What is claimed is:

1. A ferroelectric liquid crystal device comprising:

upper and lower substrates, each being provided with electrodes on their respective surfaces, the substrates arranged with the electrode provided surfaces opposing each other;

an insulating film formed on the electrodes on each of the substrates;

an orientation film comprising an organic polymer, the film being formed on the insulating film and subjected to a uniaxial orientation treatment, the orientation film on each of the two substrates being arranged, wherein the orientation directions are the same;

a liquid crystal composition with a chiral smectic C phase injected between the two substrates;

drive means for switching an optical axis of the liquid crystals in the liquid crystal composition by selectively applying a voltage to the electrodes; and means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein molecules of the liquid crystal composition that are arrayed in a field between a lightning defect and a hairpin defect appear to follow the lightning defect and to oppose a direction of the uniaxial orientation treatment and wherein a pretilt angle of the liquid crystal composition to the orientation film is 12° or more and less than 30° wherein a stable C1U orientation of 90% or more is obtained.

2. A device according to claim 1, wherein the pretilt angle is equal to or over a tilt angle of a liquid crystal composition used.

3. A device according to claim 1, wherein the uniaxial orientation treatment for the orientation film is rubbing.

4. A device according to claim 1, wherein the obtained stable C1U orientation is 95% or more.

5. A device according to claim 1, wherein the pretilt angle is larger than an inclination angle of the layer structure.

6. A device according to claim 1, wherein a tilt angle of the liquid crystal composition is between 7° and 27°.

7. A device according to claim 1, wherein an inclination angle of the layer structure is between 0° and 25°.

8. A device according to claim 1, wherein the liquid crystal composition contains phenyl pyrimidine.

9. A device according to claim 1, wherein the organic polymer film is a polyimide film.

10. A device according to claim 1, wherein the thickness of the organic polymer film is between 50 Å and 1000 Å.

* * * * *